(12) United States Patent
Li et al.

(10) Patent No.: US 11,882,433 B2
(45) Date of Patent: *Jan. 23, 2024

(54) COMMUNICATION METHOD AND COMMUNICATIONS APPARATUS

(71) Applicant: Huawei Technologies Co., Ltd., Shenzhen (CN)

(72) Inventors: He Li, Shanghai (CN); Li Hu, Shanghai (CN); Rong Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,939

(22) Filed: Jul. 19, 2022

(65) Prior Publication Data

US 2023/0007472 A1    Jan. 5, 2023

Related U.S. Application Data

(63) Continuation of application No. 17/513,021, filed on Oct. 28, 2021, now Pat. No. 11,445,365, which is a (Continued)

(30) Foreign Application Priority Data

Apr. 28, 2019    (CN) .................... 201910351464.X

(51) Int. Cl.
*H04L 29/06*    (2006.01)
*H04W 12/033*    (2021.01)
(Continued)

(52) U.S. Cl.
CPC ....... *H04W 12/033* (2021.01); *H04W 12/041* (2021.01); *H04W 12/0431* (2021.01); *H04W 12/10* (2013.01); *H04W 76/19* (2018.02)

(58) Field of Classification Search
USPC .......................................................... 726/2
See application file for complete search history.

(56) References Cited

U.S. PATENT DOCUMENTS 10,499,357 B1 * 12/2019 Tiwari ................. H04W 12/08
10,555,168 B2 *  2/2020 Mildh ................. H04W 12/041
(Continued)

FOREIGN PATENT DOCUMENTS

CN    101626607 A       1/2010
CN    101626607 A   ‡   1/2010
(Continued)

OTHER PUBLICATIONS

Chen, Jie et al. An Ecology-Based Adaptive Network Control Scheme for Radio Resource Management in Heterogeneous Wireless Networks. 2006 1st Bio-Inspired Models of Network, Information and Computing Systems. https://ieeexplore.ieee.org/stamp/stamp.jsp?tp=&arnumber=4205317 (Year: 2006).*
(Continued)

*Primary Examiner* — Jeremiah L Avery
(74) *Attorney, Agent, or Firm* — Conley Rose, P.C.

(57) ABSTRACT

A communication method and a communications apparatus, where the method includes: after receiving an RRC resume request message from a UE, determining, by a target access network device, a first user plane security protection method between the target access network device and the UE based on a context information obtaining response from a source access network device; determining a first user plane security key between the target access network device and the UE; when receiving first uplink user plane data from the UE, performing user plane security deprotection on the first uplink user plane data based on the first user plane security
(Continued)

key and the first user plane security protection method, to obtain uplink user plane data; and sending the uplink user plane data.

20 Claims, 17 Drawing Sheets

Related U.S. Application Data continuation of application No. PCT/CN2020/087600, filed on Apr. 28, 2020.

(51) Int. Cl.
*H04W 76/19* (2018.01)
*H04W 12/0431* (2021.01)
*H04W 12/041* (2021.01)
*H04W 12/10* (2021.01)

(56) References Cited

U.S. PATENT DOCUMENTS

| | | | | |
|---|---|---|---|---|
| 11,284,468 | B2 * | 3/2022 | Mildh | H04W 24/10 |
| 2018/0139778 | A1 ‡ | 5/2018 | Chou | H04W 74/006 |
| 2018/0199398 | A1 ‡ | 7/2018 | Dao | H04W 76/27 |
| 2018/0206080 | A1 ‡ | 7/2018 | Chen | H04W 72/005 |
| 2019/0052607 | A1 | 2/2019 | Ohlsson et al. | |
| 2019/0124506 | A1 | 4/2019 | Tenny et al. | |
| 2019/0313333 | A1 * | 10/2019 | Kim | H04W 52/0225 |
| 2019/0320316 | A1 * | 10/2019 | Mildh | H04W 76/27 |
| 2019/0320488 | A1 * | 10/2019 | Mildh | H04W 76/11 |
| 2020/0015088 | A1 ‡ | 1/2020 | Luo | H04W 36/0038 |
| 2020/0021978 | A1 ‡ | 1/2020 | Chai | H04W 76/25 |
| 2020/0128403 | A1 ‡ | 4/2020 | Wu | H04W 12/0431 |
| 2020/0137643 | A1 ‡ | 4/2020 | Li | H04W 36/0038 |
| 2022/0095161 | A1 * | 3/2022 | Kim | H04W 12/033 |
| 2023/0156820 | A1 * | 5/2023 | Wu | H04W 12/0431 370/329 |

FOREIGN PATENT DOCUMENTS

| | | | | |
|---|---|---|---|---|
| CN | 102811468 | A ‡ | 12/2012 | H04W 12/02 |
| CN | 102811468 | A | 12/2012 | |
| CN | 108632815 | A ‡ | 10/2018 | H04W 12/001 |
| CN | 108632815 | A | 10/2018 | |
| CN | 108632922 | A | 10/2018 | |
| CN | 108632922 | A ‡ | 10/2018 | H04W 36/005 |
| CN | 108924829 | A | 11/2018 | |
| CN | 108924829 | A ‡ | 11/2018 | H04W 12/04 |
| CN | 108966220 | A | 12/2018 | |
| CN | 108966220 | A ‡ | 12/2018 | H04W 12/033 |
| CN | 109362108 | A ‡ | 2/2019 | H04L 29/06 |
| CN | 109362108 | A | 2/2019 | |
| CN | 109586900 | A | 4/2019 | |
| CN | 109600803 | A ‡ | 4/2019 | H04L 9/08 |
| CN | 109600803 | A | 4/2019 | |
| WO | 2018142207 | A1 | 8/2018 | |

OTHER PUBLICATIONS

Liyanage, Madhusanka et al. Opportunities and Challenges of Software-Defined Mobile Networks in Network Security. IEEE Security & Privacy, vol. 14, Issue: 4. https://ieeexplore.ieee.org/stamp/stamp.jsp?tp=&arnumber=7535093 (Year: 2016).*

Liyanage, Madhusanka et al. Enhancing Security of Software Defined Mobile Networks. IEEE Access, vol. 5. https://ieeexplore.ieee.org/stamp/stamp.jsp?tp=&arnumber=7921532 (Year: 2017).*

3GPP TS 38.423 V15.3.0, Mar. 2019, "3rd Generation Partnership Project; Technical Specification Group Radio Access Network; NG-RAN; XN application protocol (XnAP) (Release 15)," 294 pages.‡

3GPP TS 33.501 V15.4.0, Mar. 2019, "3rd Generation Partnership Project; Technical Specification Group Services and System Aspects; Security architecture and procedures for 5G system (Release 15)," 187 pages.‡

3GPP TS 38.413 V15.3.0, Mar. 2019, "3rd Generation Partnership Project; Technical Specification Group Radio Access Network; NG-RAN; NG Application Protocol (NGAP) (Release 15)," 319 pages.‡

3GPP TS 38.331 V15.5.1, Apr. 2019, "3rd Generation Partnership Project; Technical Specification Group Radio Access Network; NR; Radio Resource Control (RRC) protocol specification (Release 15)," 491 pages.‡

3GPP TS 33.501 V15.3.0, Dec. 2018, "3rd Generation Partnership Project; Technical Specification Group Services and System Aspects; Security architecture and procedures for 5G system (Release 15)," 180 pages.‡

3GPP TS 33.501 V15.3.1, Dec. 2018, "3rd Generation Partnership Project; Technical Specification Group Services and System Aspects; Security architecture and procedures for 5G system (Release 15)," 182 pages.‡

Samsung, et al., "Correction on RRC states terminology usage," 3GPP TSG-SA WG3 Meeting #94 , Kochi (India), Jan. 28-Feb. 1, 2019, S3-190423, 12 pages.‡

Huawei, et al., "Add details on handling UP security in RRC inactive scenario," 3GPP TSG-SA WG3 Meeting #95, Reno (US), May 6-10, 2019, S3-191379, 4 pages.‡

Ericsson, "Rapporteur updates on version 15.2.0," 3GPP TSG-RAN WG3 Meeting #103, Athens, Greece, Feb. 25-Mar. 1, 2019, R3-190986, 2 pages.‡

Ericsson, "Correction on UE AMBR on XnAP," 3GPP TSG-RAN WG3 Meeting #101, Gothenburg, Sweden, Aug. 20-24, 2018, R3-185008, 15 pages.‡

Khlass, Ahlem et al. On the Flexible and Performance-Enhanced Radio Resource Control for 5G NR Networks. 2019 IEEE 90th Vehicular Technology Conference (VTC2019-Fall). https://ieeexplore.ieee.org/stamp/stamp.jsp?tp=&arnumber=8891551 (Year: 2019).‡

Chandramouli, Devaki et al. Access Control and Mobility Management. Wiley Telecom. pp. 225-282. https://ieeexplore.ieee.org/xpl/ebooks/bookPdfWithBanner.jsp?fileName=8689305.pdf&bkn=8689272&pdfType=chapter (Year: 2019).‡

Chandramouli, D., et al., "Access Control and Mobility Management," 5G for the Connected World, First Edition, 2019, 58 pages.

Khlass, A., "On the Flexible and Performance-Enhanced Radio Resource Control for 5G NR networks," IEEE 90th vehicular Technology Conference (VTC2019-Fall), https://ieeexplore.ieee.org/stamp/stamo.jsp?tp=&arnumber=8891551, 2019, 6 pages.

SA WG3, "Rel-15 CRs on Security aspects of 5G System—Phase 1 (5GS_Ph1-SEC)," 3GPP TSG SA #83, SP-190095, Mar. 12, 2019, 190 pages.

MediaTek Inc., "Correction on UE configuration for RRC Resume procedure," 3GPP TSG RAN WG2 #105bis, R2-1905366, Apr. 12, 2019, 6 pages.

* cited by examiner
‡ imported from a related application

COMMUNICATION METHOD AND COMMUNICATIONS APPARATUS

CROSS-REFERENCE TO RELATED APPLICATIONS

This is a continuation of U.S. patent application Ser. No. 17/513,021 filed on Oct. 28, 2021, which is a continuation of Int'l Patent App No. PCT/CN2020/087600 filed on Apr. 28, 2020, which claims priority to Chinese Patent App. No. 201910351464.X filed on Apr. 28, 2019, all of which are incorporated by reference.

TECHNICAL FIELD

Embodiments of this application relate to the field of communications technologies, and for example, to a communication method and a communications apparatus.

BACKGROUND

As communications technologies develop, a 5th generation (5G) mobile communications system emerges. In addition to user plane encryption protection in a Long-Term Evolution (LTE) system, user plane integrity protection is further introduced into the 5G system. The user plane integrity protection is to protect integrity of data in a user plane transmission process. Moreover, whether to enable the user plane encryption protection and the user plane integrity protection in the 5G system is determined as required.

The 5G system further proposes a new status, namely, an inactive state, which is different from an idle state and a connected state. The inactive state is also referred to as a deactivated state, a third state, an inactive state, or the like. In the idle state, a user equipment (UE), a base station, and a core network all enter the idle state, access stratum (AS) security contexts previously used by the UE and the base station are all deleted, the base station deletes context information of the UE, and the context information of the UE includes an AS security context used by the UE. In the connected state, the UE, the base station, and the core network are all in the connected state. In this case, the UE and the base station are using the AS security context. In the inactive state, the base station connected to the UE stores context information of the UE, where the context information includes an AS security context of the UE. For the core network, even if the UE is in the inactive state, it is still considered that the UE is in the connected state. Therefore, after the UE enters the inactive state from the connected state, the base station also enters the inactive state, but the core network is still in the connected state. An advantage of entering the inactive state by the UE is that the UE can quickly resume to the connected state, thereby reducing a delay caused by a communication interruption.

An inactive scenario may relate to two processes: The UE and the base station may enter the inactive state from the connected state, and this process may be referred to as a suspend process. The UE and the base station may enter the connected state from the inactive state, and this process may be referred to as a resume process.

Although user plane security protection, namely the user plane encryption protection and the user plane integrity protection, is introduced into the 5G system, the user plane security protection is applicable to the connected state. In the inactive scenario, the user plane security protection is not involved, and moreover, user plane on-demand security protection is not involved. Therefore, how to ensure user plane security in the inactive scenario is an urgent technical problem to be resolved.

SUMMARY

Embodiments of this application provide a communication method and a communications apparatus, to ensure user plane security in an inactive scenario, thereby ensuring user plane data transmission security in the inactive scenario.

A first aspect of the embodiments of this application provides a communication method, including: after receiving a radio resource control (RRC) resume message from user equipment, determining, by a target access network device, a first user plane security protection method between the target access network device and the user equipment based on a context information obtaining response from a source access network device; determining a first user plane security key between the target access network device and the user equipment; when receiving first uplink user plane data from the user equipment, performing user plane security deprotection on the first uplink user plane data based on the first user plane security key and the first user plane security protection method, to obtain uplink user plane data; and sending the uplink user plane data, for example, to a user plane function in a core network.

The target access network device is an access network device that is to establish an RRC connection to the user equipment in a process in which the user equipment enters a connected state from a third state. The source access network device is an access network device that sends an RRC release message to the user equipment to enable the user equipment to enter the third state from the connected state, that is, an access network device that has established an RRC connection to the user equipment before the user equipment enters the third state.

According to the first aspect of the embodiments of this application, when the target access network device receives an RRC resume message, it indicates that the user equipment is to enter the connected state from the third state and is to establish an RRC connection to the target access network device. In this case, the target access network device determines the first user plane security protection method based on information carried in the context information obtaining response, determines the first user plane security key, performs security deprotection on the first uplink user plane data based on the first user plane security protection method and the first user plane security key, and performs user plane security protection on downlink user plane data, to ensure user plane data transmission security in a resume process.

In a possible implementation, the context information obtaining response includes a user plane security policy of the user equipment. The target access network device directly determines the first user plane security protection method between the target access network device and the user equipment based on the user plane security policy, and for example, may determine the first user plane security protection method based on the user plane security policy and a status of the target access network device. The target access network device may activate user plane security according to the first user plane security protection method. The first user plane security protection method is determined based on the user plane security policy and the status of the target access network device. Therefore, the activated user plane security not only meets a requirement of the user plane security policy, but also meets a requirement of a current environment.

In a possible implementation, the context information obtaining response includes a user plane security policy of the user equipment and first indication information. The first indication information is used to indicate a second user plane security protection method used before the user equipment and the source access network device enter the third state from the connected state. The target access network device directly determines the second user plane security protection method indicated by the first indication information as the first user plane security protection method, or determines the second user plane security protection method as the first user plane security protection method when determining that the second user plane security protection method can be supported. The second user plane security protection method is used before the user equipment and the source access network device enter the third state from the connected state. The second user plane security protection method is used as a user plane security protection method between the target access network device and the user equipment, such that the user plane security protection method used before the user equipment and the source access network device enter the third state from the connected state is consistent with the user plane security protection method used after the user equipment and the source access network device enter the connected state from the third state.

In a possible implementation, the context information obtaining response includes a user plane security policy of the user equipment and first indication information. When determining that the second user plane security protection method cannot be supported or that the second user plane security protection method is not used, the target access network device determines the first user plane security protection method based on the user plane security policy, such that activated user plane security not only meets a requirement of the user plane security policy, but also meets a requirement of a current environment. Alternatively, in this case, the target access network device sends an RRC message to the user equipment, where the RRC message is used to trigger the user equipment to re-establish an RRC connection to the target access network device. In a process of re-establishing the RRC connection, the target access network device re-negotiates a user plane security protection method with the user equipment to determine the first user plane security protection method. In this way, the first user plane security protection method can be compatible with other approaches to a maximum extent.

In a possible implementation, after activating user security, the target access network device may notify a session management network element of an activation result. As such, the session management network element learns of the used first user plane security protection method.

In a possible implementation, after determining the first user plane security protection method, the target access network device may determine the first user plane security key between the target access network device and the user equipment according to the first user plane security protection method. As such, the target access network device performs user plane security deprotection on the first uplink user plane data based on the first user plane security protection method and the first user plane security key, and performs user plane security protection on downlink user plane data.

In a possible implementation, the target access network device may send second indication information to the user equipment using an RRC resume message, that is, the second indication information is carried in the RRC resume message. The second indication information is used to indicate the first user plane security protection method determined by the target access network device. The user equipment activates user plane security based on the second indication information.

If the target access network device determines the first user plane security protection method based on the first indication information, when the user equipment stores the first indication information in a suspend process, the RRC resume message may not carry the second indication information, and the user equipment directly activates the user plane security based on the first indication information.

The target access network device may activate the user plane security before, after, or when sending the RRC resume message.

A second aspect of the embodiments of this application provides a target access network device. The target access network device has a function of implementing the method provided in the first aspect. The function may be implemented by hardware, or may be implemented by hardware executing corresponding software. The hardware or the software includes one or more modules corresponding to the foregoing function.

In a possible implementation, the target access network device includes a transceiver unit and a processing unit. The processing unit is configured to: after the transceiver unit receives an RRC resume message from user equipment, determine a first user plane security protection method between the target access network device and the user equipment based on a context information obtaining response from a source access network device; determine a first user plane security key between the target access network device and the user equipment; and when the transceiver unit receives first uplink user plane data from the user equipment, perform user plane security deprotection on the first uplink user plane data based on the first user plane security key and the first user plane security protection method, to obtain uplink user plane data. The transceiver unit is configured to send the uplink user plane data, for example, send the uplink user plane data to a user plane function in a core network.

In a possible implementation, the target access network device includes a processor, a transceiver, and a memory. The transceiver is configured to receive and send information. The memory stores a computer program, and the computer program includes a program instruction. The processor is connected to the memory and the transceiver using a bus, and the processor executes the program instruction stored in the memory, such that user equipment performs the following operations: after the transceiver receives an RRC resume message from the user equipment, determining a first user plane security protection method between the target access network device and the user equipment based on a context information obtaining response from a source access network device; determining a first user plane security key between the target access network device and the user equipment; when the transceiver receives first uplink user plane data from the user equipment, performing user plane security deprotection on the first uplink user plane data based on the first user plane security key and the first user plane security protection method, to obtain uplink user plane data; and controlling the transceiver to send the uplink user plane data, for example, by sending the uplink user plane data to a user plane function in a core network.

Based on a same concept, for a problem-resolving principle and beneficial effects of the target access network device, refer to the method and beneficial effects brought by the method in the first aspect. Therefore, for implementation of the apparatus, refer to the implementation of the method. Repeated parts are not described again.

A third aspect of the embodiments of this application provides a computer-readable storage medium. The computer-readable storage medium stores a computer program, the computer program includes a program instruction, and when the program instruction is executed by a processor, the processor is enabled to perform the method according to the first aspect.

A fourth aspect of the embodiments of this application provides a computer program product including an instruction. When the computer program product runs on a computer, the computer is enabled to perform the method according to the first aspect.

A fifth aspect of the embodiments of this application provides a communication method, including: after sending an RRC resume request to a target access network device, determining, by user equipment, a first user plane security protection method between the user equipment and the target access network device; determining a first user plane security key between the user equipment and the target access network device; performing user plane security protection on uplink user plane data based on the first user plane security protection method and the first user plane security key, to obtain first uplink user plane data; and sending the first uplink user plane data to the target access network device.

For downlink transmission, when receiving first downlink user plane data from the target access network device, the user equipment performs user plane security deprotection on the first downlink user plane data based on the first user plane security protection method and the first user plane security key, to obtain downlink user plane data.

According to the fifth aspect of the embodiments of this application, after determining the first user plane security protection method and the first user plane security key, the user equipment performs user plane security protection on the uplink user plane data based on the first user plane security protection method and the first user plane security key, and performs user plane security deprotection on the downlink user plane data, to ensure user plane data transmission security in a resume process.

In a possible implementation, the user equipment receives an RRC resume message from the target access network device, where the RRC resume message includes second indication information, and where the second indication information is used to indicate the first user plane security protection method. The user equipment directly determines the first user plane security protection method between the user equipment and the target access network device based on the second indication information, to activate user plane security according to the first user plane security protection method.

In a possible implementation, after receiving the RRC resume message carrying the second indication information, the user equipment releases an RRC connection. The user equipment may release the RRC connection by reporting an error to the target access network device, or the target access network device may actively initiate an RRC connection release procedure or initiate an RRC connection re-establishment procedure.

In a possible implementation, after receiving an RRC release message from the target access network device, the user equipment enters a third state from a connected state, and stores first indication information. The first indication information is used to indicate a second user plane security protection method used before the user equipment and a source access network device enter the third state from the connected state. The user equipment stores the first indication information, such that the same user plane security protection method is used before the user equipment enters the third state from the connected state and after the user equipment enters the connected state from the third state.

In a possible implementation, when the user equipment stores the first indication information, the user equipment may directly determine the second user plane security protection method indicated by the first indication information as the first user plane security protection method, such that the same user plane security protection method is used before the user equipment enters the third state from the connected state and after the user equipment enters the connected state from the third state.

In a possible implementation, the user equipment receives an RRC resume message from the target access network device, where the RRC resume message does not include second indication information, and the second indication information is used to indicate a user plane security protection method determined by the target access network device. The RRC resume message does not carry the second indication information. By default, the user equipment and the target access network device determine the first user plane security protection method based on the first indication information and activate user plane security. When the user equipment stores the first indication information, the target access network device does not need to notify the user equipment, thereby reducing signaling overheads.

In a possible implementation, when the first user plane security protection method is determined, the user equipment determines the first user plane security key according to the first user plane security protection method. There may be two cases. In the first case, after sending the RRC resume request, the user equipment generates all user plane security keys, and then determines the first user plane security key in all the user plane security keys according to the first user plane security protection method. In the second case, the user equipment directly determines the first user plane security key according to the first user plane security protection method.

In a possible implementation, after receiving an RRC release message from the target access network device, the user equipment stores a second user plane security key, where the second user plane security key is used before the user equipment and a source access network device enter a third state from a connected state. The user equipment stores the second user plane security key, such that after sending the RRC resume request, the user equipment can immediately or quickly perform user plane security protection on the uplink user plane data using a second user plane security key and a second user plane security protection method.

In a possible implementation, when the user equipment stores the second user plane security key, after determining the first user plane security key in a resume process, the user equipment deletes the second user plane security key, to prevent the user equipment from not knowing which user plane security key is to be used.

In a possible implementation, before receiving an RRC resume message from the target access network device, the user equipment may activate user plane security, and send first uplink user plane data to the target access network device. In this manner, the user equipment may perform user plane security protection on the uplink user plane data using a second user plane security protection method and a second user plane security key. As such, the user equipment can quickly perform user plane security protection on the user plane data when the user equipment is to send the uplink user plane data.

In a possible implementation, after receiving an RRC resume message from the target access network device, the user equipment may activate user plane security, and send first uplink user plane data to the target access network device. In this manner, the user equipment may perform user plane security protection on the uplink user plane data using a newly determined user plane security protection method and a newly determined user plane security key.

A sixth aspect of the embodiments of this application provides user equipment. The user equipment has a function of implementing the method provided in the fifth aspect. The function may be implemented by hardware, or may be implemented by hardware executing corresponding software. The hardware or the software includes one or more modules corresponding to the foregoing function.

In a possible implementation, the user equipment includes a transceiver unit and a processing unit. The processing unit is configured to: after the transceiver unit sends an RRC resume request to a target access network device, determine a first user plane security protection method between the user equipment and the target access network device; determine a first user plane security key between the user equipment and the target access network device; and perform user plane security protection on uplink user plane data based on the first user plane security protection method and the first user plane security key, to obtain first uplink user plane data. The transceiver unit is configured to send the first uplink user plane data to the target access network device.

In a possible implementation, the user equipment includes a processor, a transceiver, and a memory. The transceiver is configured to receive and send information. The memory stores a computer program, and the computer program includes a program instruction. The processor is connected to the memory and the transceiver using a bus, and the processor executes the program instruction stored in the memory, such that user equipment performs the following operations: after controlling the transceiver to send an RRC resume request to a target access network device, determining a first user plane security protection method between the user equipment and the target access network device; determining a first user plane security key between the user equipment and the target access network device; performing user plane security protection on uplink user plane data based on the first user plane security protection method and the first user plane security key, to obtain first uplink user plane data; and controlling the transceiver to send the first uplink user plane data to the target access network device.

Based on a same concept, for a problem-resolving principle and beneficial effects of the user equipment, refer to the method and beneficial effects brought by the method in the fifth aspect. Therefore, for implementation of the apparatus, refer to implementation of the method. Repeated parts are not described again.

A seventh aspect of the embodiments of this application provides a computer-readable storage medium. The computer-readable storage medium stores a computer program, the computer program includes a program instruction, and when the program instruction is executed by a processor, the processor is enabled to perform the method according to the fifth aspect.

An eighth aspect of the embodiments of this application provides a computer program product including an instruction. When the computer program product runs on a computer, the computer is enabled to perform the method according to the fifth aspect.

A ninth aspect of the embodiments of this application provides a communications system, including the target access network device provided in the first aspect and the user equipment provided in the second aspect.

BRIEF DESCRIPTION OF DRAWINGS

To describe technical solutions in embodiments of this application or in the background more clearly, the following briefly describes the accompanying drawings for describing the embodiments of this application or the background.

DESCRIPTION OF EMBODIMENTS

Figure 1:
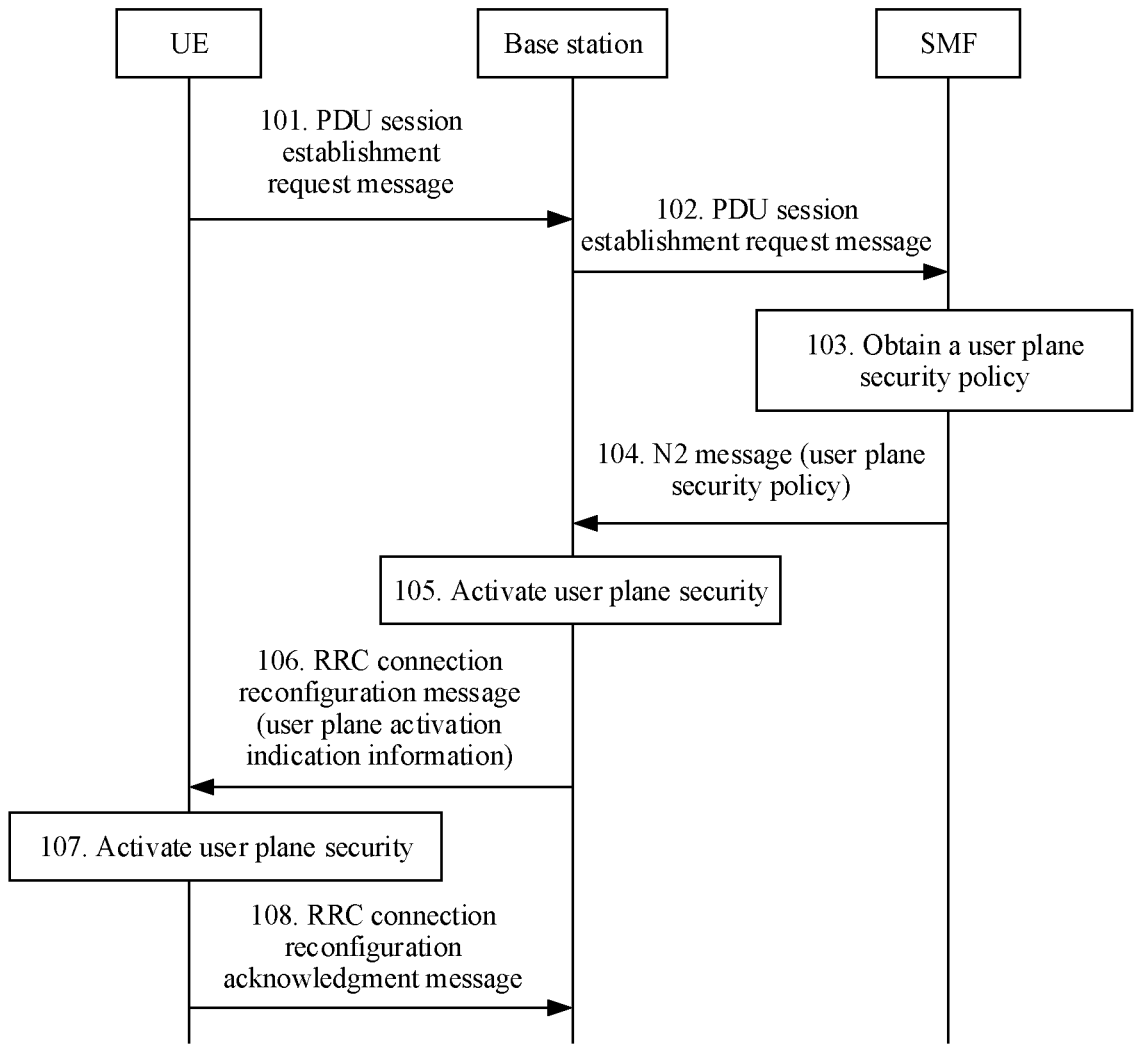
FIG. 1 is a schematic flowchart of a user plane on-demand security process.

The following describes technical solutions in embodiments of this application with reference to the accompanying drawings in the embodiments of this application. In the description of this application, "/" represents an "or" relationship between associated objects unless otherwise specified. For example, A/B may represent A or B. The term "and/or" in this application indicates only an association relationship for describing associated objects and represents that three relationships may exist. For example, A and/or B may represent the following three cases: Only A exists, both A and B exist, and only B exists, where A and B may be singular or plural. In addition, unless otherwise specified, "a plurality of" in the description of this application means two or more than two. "At least one item (piece) of the following" or a similar expression thereof refers to any combination of these items, including any combination of singular items (pieces) or plural items (pieces). For example, at least one (piece) of a, b, or c may represent: a, b, c, a-b, a-c, b-c, or a-b-c, where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and that the terms such as "first" and "second" do not indicate a definite difference.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that as network architectures evolve and new service scenarios emerge, the technical solutions provided in the embodiments of this application are also applicable to similar technical problems.

The following describes names or terms used in the embodiments of this application.

A user plane security policy includes a user plane encryption protection policy and a user plane integrity protection policy. The user plane encryption protection policy has three possible values: NOT NEEDED, PREFERRED, and REQUIRED; and the user plane integrity protection policy has three possible values: NOT NEEDED, PREFERRED, and REQUIRED, where NOT NEEDED indicates that the policy does not need to be enabled, PREFERRED indicates that the policy can be enabled or disabled, and REQUIRED indicates that the policy needs to be enabled. The foregoing three possible values each may be indicated using two bits (bit). For example, 00 indicates that the policy does not need to be enabled, 01 indicates that the policy may be enabled or may not be enabled, and 11 indicates that the policy needs to be enabled. A specific manner in which the three possible values are indicated for the user plane encryption protection policy and the user plane integrity protection policy is not limited in the embodiments of this application.

User plane encryption protection is to protect the confidentiality of data during transmission. Therefore, user plane encryption protection can also be referred to as user plane confidentiality protection. Confidentiality means that the actual content cannot be directly seen. User plane integrity protection is to protect integrity of data during transmission on a user plane. Integrity means that the data is original and has not been tampered with.

A user plane security protection method refers to whether to enable user plane encryption protection and/or user plane integrity protection on a user equipment side or a base station side.

A security algorithm may include a user plane security algorithm (that is, a security algorithm used on a user plane) and a signaling plane security algorithm (that is, a security algorithm used on a signaling plane). The security algorithm used on the user plane is used to protect user plane data, and may include a user plane encryption algorithm and a user plane integrity algorithm. The security algorithm used on the signaling plane is used to protect signaling, and may include a signaling plane encryption algorithm and a signaling plane integrity algorithm. The security algorithm used on the user plane and the security algorithm used on the signaling plane may be the same or may be different. A meaning of being the same is that if the user plane integrity protection is enabled, an integrity algorithm used on the user plane is the same as an integrity algorithm used on the signaling plane. Alternatively, if the user plane encryption protection is enabled, an encryption algorithm used on the user plane is the same as an encryption algorithm used on the signaling plane. The security algorithm used on the signaling plane is different from the security algorithm used on the user plane provided that the security algorithms includes different algorithms. For example, an encryption algorithm used on the user plane is an encryption algorithm A, an encryption algorithm used on the signaling plane is an encryption algorithm B, and both the user plane and the signaling plane use an integrity algorithm C. In this case, the security algorithm used on the user plane is different from the security algorithm used on the signaling plane.

A security key may include a user plane security key and a signaling plane security key. The user plane security key is used to protect user plane data, and may include a user plane encryption key and a user plane integrity protection key. The signaling plane security key is used to protect signaling, and may be, for example, a key for protecting radio resource control (RRC) signaling, namely, an RRC key. The RRC key may include an RRC encryption key and an RRC integrity protection key.

Security protection: For a node that performs a security function, a user plane/signaling plane security algorithm and a user plane/signaling plane security key are used together to protect user plane data. For example, encryption protection is performed on the user plane/signaling plane data using an encryption key and an encryption algorithm. Integrity protection is performed on the user plane/signaling plane data using an integrity protection key and an integrity protection algorithm. A sequential relationship between the encryption protection and the integrity protection is not limited in the embodiments of this application. To be more specific, the encryption protection may be first performed on the user plane/signaling plane data, and then the integrity protection is performed. Alternatively, the integrity protection may be first performed on the user plane/signaling plane data, and then the encryption protection is performed on the user plane/signaling plane data. Certainly, the user plane and the signaling plane may not use a same execution sequence.

Security deprotection: For a node that performs a security function, a user plane/signaling plane security algorithm and a user plane/signaling plane security key are used together to obtain original user plane data. For example, encrypted user plane/signaling plane data is decrypted using an encryption key and an encryption algorithm. Integrity protection verification is performed on the user plane data using an integrity protection key and an integrity protection algorithm. A sequence of the decryption and the integrity protection verification is not limited in the embodiments of the present disclosure. However, it should be understood that, if encryption protection is first performed on the user plane/signaling plane data and then integrity protection is performed on the user plane/signaling plane data, in security deprotection, the integrity protection is first verified, and then the encrypted user plane data is decrypted. Alternatively, if integrity protection is first performed on the user plane/signaling plane data and then the user plane/signaling plane data is encrypted, a sequence of the security deprotection is first decrypting the encrypted data, and then performing integrity protection verification.

Activating user plane/signaling plane security means that when a user plane/signaling plane security protection method is determined, the user plane/signaling plane security may start to be activated using a user plane/signaling plane security algorithm and a user plane/signaling plane security key. That is, security protection may start to be performed on to-be-transmitted user plane data/signaling using the user plane/signaling plane security protection method, the user plane/signaling plane security algorithm, and the user plane/signaling plane security key. For example, if a determined user plane security protection method is to enable user plane encryption protection and disable user plane integrity protection, a user plane encryption algorithm is an encryption algorithm A, and a user plane encryption key is a key K, user plane encryption protection is performed on to-be-transmitted user plane data using the encryption algorithm A and the key K. An effect that can be achieved by activating a user plane security protection method is that a node that activates user plane security may start to perform security protection on user plane data and may start to perform security deprotection on user plane data. It should be understood that security protection and security deprotection may further be separately activated. For example, after sending a security activation message, a base station activates security deprotection; and after receiving a security activation acknowledgment message, the base station activates security protection.

FIG. 1 is a schematic flowchart of a user plane on-demand security process. The process may include the following steps.

Step 101. A UE sends a protocol data unit (PDU) session establishment request message to a base station. Correspondingly, the base station receives the PDU session establishment request message from the UE.

The PDU session establishment request message includes information such as a PDU session identity (ID), a data network name (DNN), and network slice selection auxiliary information or network slice selection assistance information (NSSAI).

Step 102. The base station sends a PDU session establishment request message to a session management function (SMF) using an access and mobility management function (AMF).

For example, the base station first sends the PDU session establishment request message to the AMF, and then the AMF sends the PDU session establishment request message to the SMF. The AMF between the base station and the SMF is omitted in FIG. 1.

Step 103. The SMF obtains a user plane security policy.

The SMF may obtain the user plane security policy from a unified data management (UDM) function, or may obtain the user plane security policy from local configuration information of the SMF.

The user plane security policy obtained by the SMF is a user plane security policy of the UE, and may be a user plane security policy for a PDU session of the UE.

Step 104. The SMF sends the user plane security policy to the base station, to be more specific, the SMF sends the user plane security policy obtained by the SMF to the base station. Correspondingly, the base station receives the user plane security policy from the SMF.

The SMF sends the user plane security policy to the AMF, and the AMF may send the user plane security policy to the base station using an N2 message, that is, the user plane security policy is carried in the N2 message.

After receiving the user plane security policy, the base station may store the user plane security policy. When storing the user plane security policy, the base station further stores a PDU session identity corresponding to the user plane security policy, namely, a PDU session ID.

Step 105. The base station activates user plane security according to the user plane security policy.

The base station activates user plane security between the base station and the UE according to the user plane security policy. For example, if a user plane encryption protection policy included in the user plane security policy is required, and a user plane integrity protection policy is required, the base station enables user plane encryption protection and user plane integrity protection, and uses a user plane encryption key, a user plane integrity protection key, and a user plane security algorithm to perform encryption protection and integrity protection, or perform decryption and verification on user plane data between the base station and the UE. For another example, if a user plane encryption protection policy included in the user plane security policy is REQUIRED, and a user plane integrity protection policy is NOT NEEDED, the base station enables user plane encryption protection, does not enable user plane integrity protection, and uses a user plane encryption key and a user plane security algorithm to perform encryption protection or decryption on user plane data between the base station and the UE.

Optionally, when the user plane encryption protection policy or the user plane integrity protection policy is PREFERRED, the base station sends a user plane security activation result (or a security result for short) to the SMF. If the base station generates a security result, the base station stores the security result.

Step 106. The base station sends an RRC connection reconfiguration message to the UE. Correspondingly, the UE receives the RRC connection reconfiguration message from the base station.

The RRC connection reconfiguration message includes user plane activation indication information. The user plane activation indication information includes user plane encryption protection activation indication information and/or user plane integrity protection activation indication information. The user plane encryption protection activation indication information is used to indicate whether to enable user plane encryption protection. The user plane integrity protection activation indication information is used to indicate whether to enable user plane integrity protection. For example, if the user plane integrity protection activation indication information included in the user plane activation indication information is "enable", and the user plane activation indication information does not include the user plane encryption protection activation indication information, the UE may determine to enable user plane encryption protection and user plane integrity protection. If the user plane encryption protection activation indication information included in the user plane activation indication information is "disable", and the user plane activation indication information does not include the user plane integrity protection activation indication information, the UE may determine not to enable user plane encryption protection and user plane integrity protection. If the user plane integrity protection activation indication information included in the user plane activation indication information is "enable", and the user plane encryption protection activation indication information included in the user plane activation indication information is "disable", the UE may determine not to enable user plane encryption protection and determine to enable user plane integrity protection. If the user plane activation indication information does not include the user plane integrity protection activation indication information or the user plane encryption protection activation indication information, the UE may determine not to enable user plane integrity protection and determine to enable user plane encryption protection.

Step 107. The UE activates user plane security. The UE activates the user plane security between the UE and the base station based on the user plane activation indication information carried in step 106, to perform security protection or security deprotection on the user plane data between the UE and the base station.

Step 108. The UE sends an RRC connection reconfiguration acknowledgment (ACK) message to the base station. Correspondingly, the base station receives the RRC connection reconfiguration acknowledgment message from the UE.

In the procedure shown in FIG. 1, in a connected state scenario, the base station obtains the user plane security policy from the SMF, activates user plane security between the base station and the UE, and sends an indication to the UE. As such, the UE activates user plane security between the UE and the base station according to the indication to ensure confidentiality and integrity of user plane data between the UE and the base station.

Figure 2:
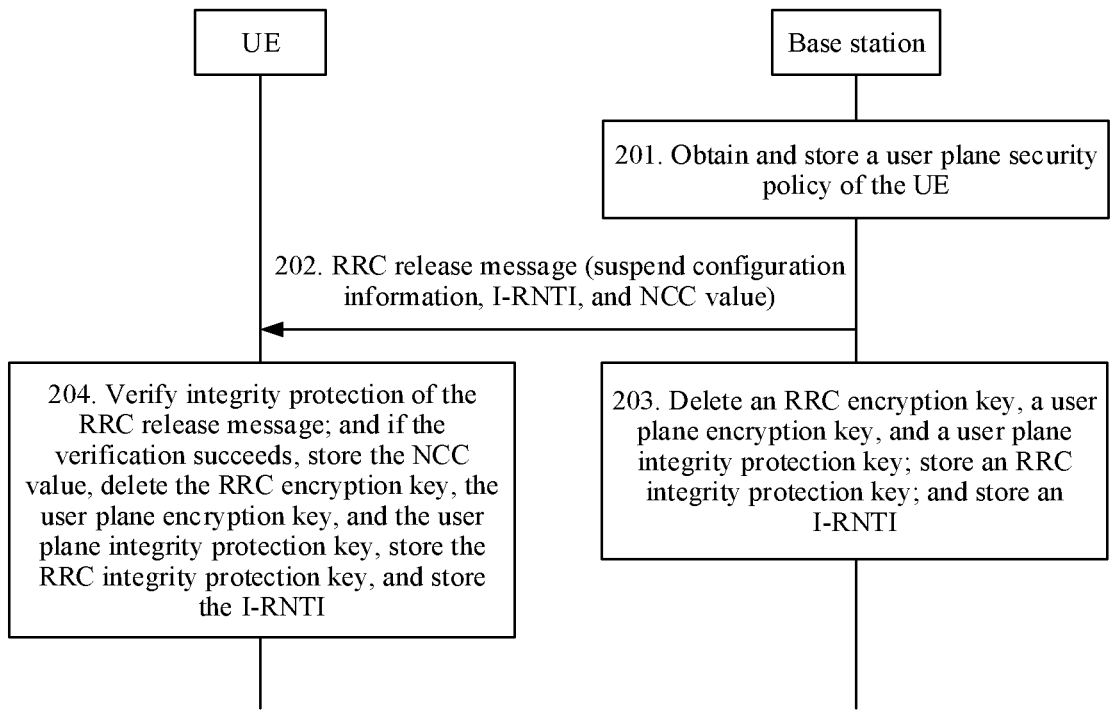
FIG. 2 is a schematic flowchart of a current suspend process.

FIG. 2 is a schematic flowchart of a current suspend process. The process may include the following steps.

Step 201. A base station obtains and stores a user plane security policy of a UE. The user plane security policy of the UE obtained and stored in step 201 may be a user plane security policy that is obtained by the base station for a PDU session from an SMF in a process of establishing the PDU session, that is, the user plane security policy transmitted in step 104 in the procedure shown in FIG. 1; or may be obtained by the base station from a switch procedure.

Optionally, the base station further stores a security result. A function of the security result is to indicate whether the user plane security policy is performed when a user plane encryption protection policy and/or a user plane integrity protection policy in the user plane security policy are/is PREFERRED (the description in 3rd Generation Partnership Project (3GPP) Technical Specification (TS) 38.413 Release f30 is: indicates whether the security policy indicated as PREFERRED in the Security Indication information element (IE) is performed or not.). Generation and use of the security result are optional. The security result needs to be generated only when the user plane encryption protection policy and/or the user plane integrity protection policy in the user plane security policy are/is PREFERRED. The security result is optionally used in some procedures. For example, the security result is used when the base station needs to send the security result to the SMF or when the base station needs to send the security result to a target base station in a switch procedure. Therefore, storage of the security result is optional. The security result includes a user plane integrity protection result (or integrity protection result for short) and a user plane confidentiality protection result (or confidentiality protection result for short). A value range of the security result is ENUMERATED (performed, not performed, . . . ). The security result is used to indicate whether user plane encryption protection and user plane integrity protection are performed on a current PDU connection.

Step 202. The base station sends an RRC release message to the UE. Correspondingly, the UE receives the RRC release message from the base station.

When the base station and the UE need to enter an inactive state from a connected state, the base station sends an RRC release message to the UE. The RRC release message includes indication information, and the indication information is used to indicate the UE to release an RRC connection, and not to enter an idle mode, but to enter the inactive mode. The indication information includes suspend configuration information. The RRC release message further includes an inactive-radio network temporary identifier (I-RNTI) and a next hop (NH) chaining counter (NCC) value. The I-RNTI is used to identify the UE in the inactive state on a base station side, such that when the UE enters the connected state from the inactive state, context information of the UE can be searched for based on the I-RNTI. The NCC value is used to generate a new base station key such as a new radio (NR) or next generation (NG) node B (gNB) key (KgNB*) when the UE returns to the connected state.

Step 203. After sending the RRC release message, the base station deletes an RRC encryption key, a user plane encryption key, and a user plane integrity protection key, and stores an RRC integrity protection key. In other words, after sending the RRC release message, the base station deletes a user plane security key and the RRC encryption key, and stores only the RRC integrity protection key.

In addition, the base station further stores the I-RNTI included in the RRC release message, such that when the UE enters the connected state from the inactive state, the base station may search for the context information of the UE based on the I-RNTI. The base station also stores the user plane security policy, and optionally stores the security result.

Step 204. After receiving the RRC release message, the UE verifies integrity protection of the RRC release message, and verifies the RRC release message using the RRC integrity protection key. If the verification succeeds, the UE stores the NCC value included in the RRC release message, deletes the RRC encryption key, the user plane encryption key, and the user plane integrity protection key, and stores only the RRC integrity protection key. In other words, when the verification succeeds, the UE deletes the user plane security key and the RRC encryption key, and stores only the RRC integrity protection key. The UE determines whether to retain the currently used KgNB based on the NCC value. A specific determining method may not relate to this embodiment of this application. Therefore, details are not described herein.

In addition, the UE further stores the I-RNTI included in the RRC release message.

Processing of a security key in the current suspend process shown in FIG. 2 is not very clear, and processing of a user plane security protection method on the base station side is not very clear either. Generation, use, and storage of the security result are optional. Processing of the user plane security protection method is not involved on a UE side. In this process, both the base station and the UE have deleted the user plane encryption key and the user plane integrity protection key. In view of this, how to process the user plane security protection method in the suspend process is clearly described in this embodiment of this application. For details, refer to Embodiment 1 to Embodiment 3.

Figure 3:
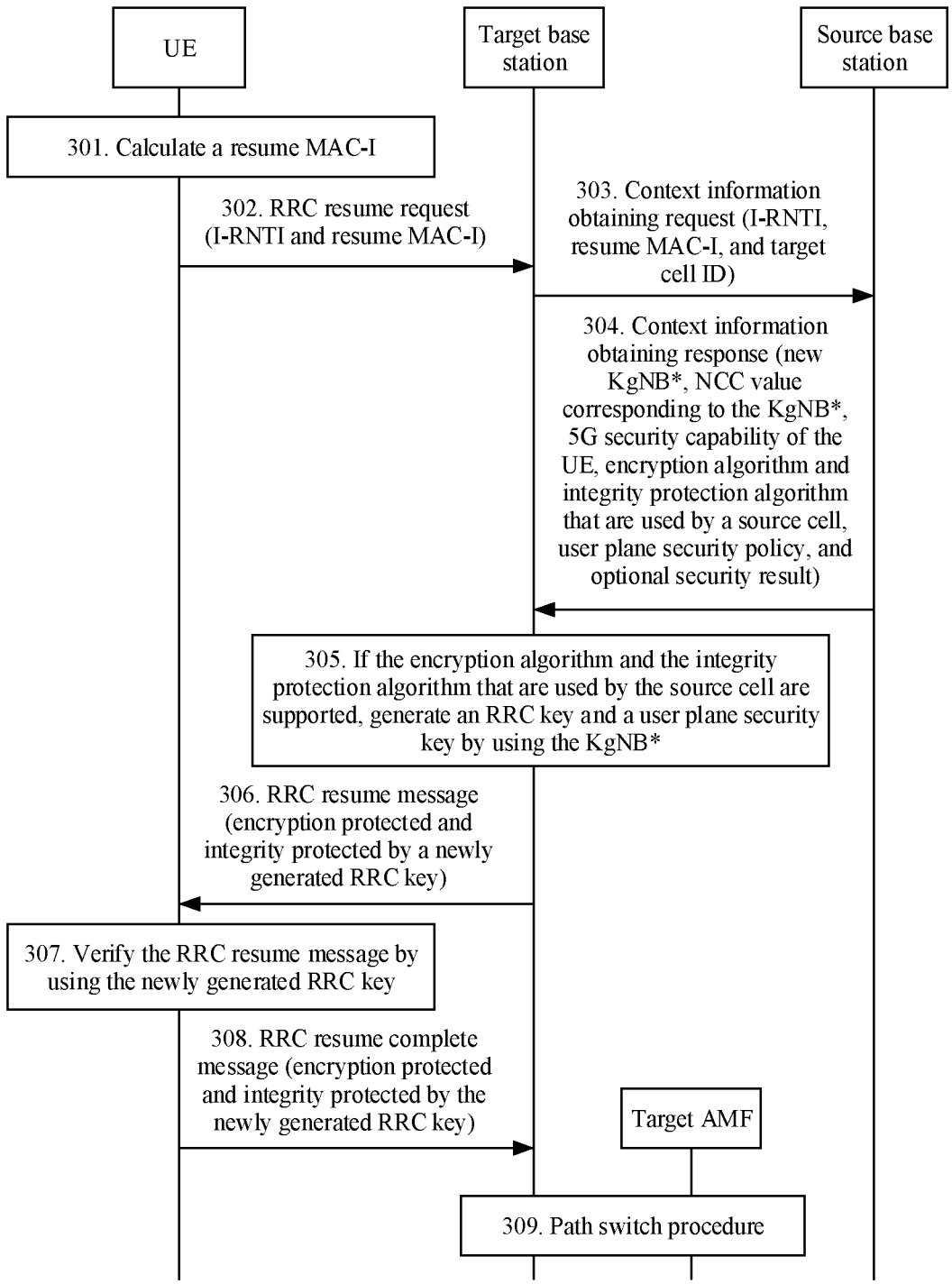
FIG. 3 is a schematic flowchart of a current resume process.

FIG. 3 is a schematic flowchart of a current resume process. A base station involved in a suspend process of the UE and a base station to which the UE establishes an RRC connection in the resume process may be the same base station or may be different base stations. In FIG. 3, an example in which the base stations are different is used. It is assumed that a base station involved when the UE enters an inactive state from a connected state is a source base station, and a base station that enters the connected state from the inactive state and that establishes the RRC connection to the UE is a target base station. The procedure shown in FIG. 3 may include the following steps.

Step 301. The UE calculates a resume message authentication code (MAC) identifier (MAC-I) using an RRC integrity protection key stored in the suspend process.

Step 302. The UE sends an RRC resume request to the target base station. Correspondingly, the target access network device receives the RRC resume request from the UE.

The RRC resume request includes an I-RNTI and a resume MAC-I. The I-RNTI may be stored in the UE in the suspend process.

After sending the RRC resume request, the UE generates a new KgNB*, and generates an RRC key using the new KgNB*. The RRC key includes an RRC encryption key and an RRC integrity protection key. Optionally, the UE further generates a user plane security key. The user plane security key includes a user plane encryption key and a user plane integrity protection key. It should be noted herein that in other approaches, it is described that the user plane security key is optionally generated. Neither a case in which the user plane security key is generated nor a case in which the user plane security key is used is described.

Step 303. After receiving the RRC resume request, the target base station initiates an Xn-application protocol (AP) retrieve procedure, and sends a context information obtaining request to the source base station to request to obtain context information of the UE. Correspondingly, the source base station receives the context information obtaining request from the target base station. Xn is an interface between base stations.

The context information obtaining request includes the I-RNTI, the resume MAC-I, and a target cell identity (ID). The I-RNTI and the resume MAC-I are sent by the UE to the target base station. The target cell identifier is an identifier of a cell that is within coverage of the target base station and that provides a service for the UE.

After receiving the context information obtaining request, the source base station searches for the context information of the UE based on the I-RNTI, and calculates a resume MAC-I using the RRC integrity protection key stored in the suspend process. If the resume MAC-I calculated by the source base station is the same as the resume MAC-I sent by the UE, the source base station generates a new KgNB*.

Step 304. The source base station sends a context information obtaining response to the target base station. Correspondingly, the target base station receives the context information obtaining response from the source base station.

The context information obtaining response includes the new KgNB* generated by the source base station, an NCC value corresponding to the KgNB*, a 5G security capability of the UE, an encryption algorithm and an integrity protection algorithm that are used by a source cell, a user plane security policy, and an optional security result.

Step 305. If the target base station supports the encryption algorithm and the integrity protection algorithm that are used by the source cell, the target base station generates an RRC key and a user plane security key using the KgNB* included in the context information obtaining response.

The RRC key includes the RRC encryption key and the RRC integrity protection key, and the user plane security key includes the user plane encryption key and the user plane integrity protection key.

Step 306. The target base station sends an RRC resume message to the UE. Correspondingly, the UE receives the RRC resume message from the target base station.

The RRC resume message is encryption protected and integrity protected by the RRC key newly generated by the target base station, namely, the newly generated RRC encryption key and RRC integrity protection key.

Step 307. The UE verifies the RRC resume message using the RRC key newly generated by the UE, to be more specific, the UE decrypts and verifies the RRC resume message using the RRC encryption key and the RRC integrity protection key that are generated by the UE in step 302. If decoding and verification succeed, the UE deletes the RRC integrity protection key stored in the suspend process.

Step 308: The UE sends an RRC resume complete message to the target base station. Correspondingly, the target base station receives the RRC resume complete message from the UE.

The UE performs encryption protection and integrity protection on the RRC resume complete message using the newly generated RRC key.

Step 309. The target base station and a target AMF perform a path switch (path switch) procedure.

If the UE enters the connected state from the inactive state, and the base station establishing the RRC connection to the UE is the source base station, step 303 and step 304 in FIG. 3 may be omitted. In this case, the following may be included: The UE directly sends the RRC resume request to the source base station; the source base station searches for the context information of the UE based on the I-RNTI, and calculates the resume MAC-I using the RRC integrity protection key stored in the suspend process; if the resume MAC-I calculated by the source base station is the same as the resume MAC-I sent by the UE, the source base station generates a new KgNB*, and generates an RRC key and a user plane security key based on the new KgNB*; the source base station performs encryption protection and integrity protection on the RRC resume message using the newly generated RRC key, and sends the protected RRC resume message to the UE; and the UE deprotects the RRC resume message using the RRC key newly generated by the UE, and sends the RRC resume complete message to the source base station, where the RRC resume complete message is protected by the RRC key.

Although the current resume process shown in FIG. 3 relates to the user plane security key, when and how to use the user plane security key are not described. In view of this, when and how to use the user plane security key in the resume process, and when to send user plane data are specified in the embodiments of this application.

The procedures shown in FIG. 2 and FIG. 3 are summarized from 3GPP TS 33.501 Release F30. For more details, refer to related content.

Figure 4:
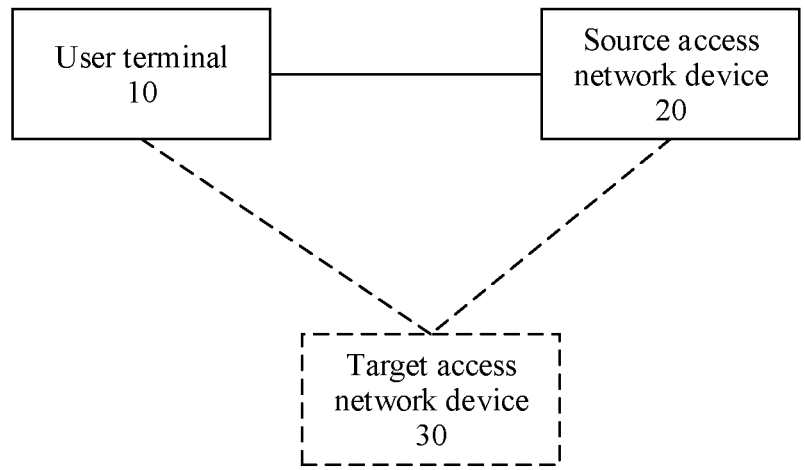
FIG. 4 is a schematic diagram of a network architecture to which an embodiment of this application is applied.

FIG. 4 is a schematic diagram of a network architecture to which an embodiment of this application is applied. The network architecture includes a user terminal 10 and a source access network device 20.

The user terminal 10 may include various handheld devices, vehicle-mounted devices, wearable devices, or computing devices that have a wireless communication function, or other processing devices connected to a wireless modem; or may include a UE, a subscriber unit, a cellular phone, a smartphone, a wireless data card, a personal digital assistant (PDA) computer, a tablet computer, a modem or wireless modem, a handheld device, a laptop computer, a cordless phone, a wireless local loop (WLL) station, a machine type communication (MTC) terminal, UE, a mobile station (MS), a terminal device, relay user equipment, or the like. The relay user equipment may be, for example, a 5G residential gateway (RG). For ease of description, in the embodiments of this application, the devices mentioned above are collectively referred to as user terminals, and an example in which the user terminal is a UE is used for description.

The access network device may be, for example, an evolved node base station (e.g., an evolved Node B (eNB or eNodeB)) in an LTE system, an upgraded eNB, that is, a next generation evolved node base station (ng-eNB), a next generation node base station (gNB) in a 5G mobile communications system, or an access network device in a future communications system.

In this embodiment of this application, a base station involved in a suspend process in which the user terminal 10 enters an inactive state from a connected state is used as the source access network device 20. The source access network device 20 may be the base station in FIG. 2. The base station may be a 5G base station, a 4G base station, or a future evolved base station. If the base station is a 4G base station, the other approaches described above should include an RRC suspend process and an RRC resume process corresponding to 4G. In this embodiment of this application, the 5G base station is used as an example for description. If the user terminal 10 enters the connected state from the inactive state, and a base station establishing an RRC connection to the user terminal 10 is not the source access network device 20, the network architecture shown in FIG. 4 further includes a target access network device 30. The target access network device 30 is the base station that establishes the RRC connection to the user terminal 10 when the user terminal 10 enters the connected state from the inactive state. In this case, the source access network device 20 may be the source base station in FIG. 3, and the target access network device may be the target base station in FIG. 3. It should be noted that the source access network device and the target access network device do not constitute a limitation on the embodiments of this application. For example, the source access network device may also be referred to as a source base station or the like, and the target access network device may also be referred to as a target base station or the like. When a resume process is described in this embodiment of this application, an example in which an access network device involved in the suspend process is different from an access network device that establishes an RRC connection to the UE in the resume process is used. In other words, an example in which the network architecture shown in FIG. 4 includes user equipment, a source access network device, and a target access network device is used.

The following describes in detail a communication method provided in the embodiments of this application. Correspondences between names in the embodiments and names in the claims may include: The first user plane security protection method in the claims is the new user plane security protection method in the embodiments, the second user plane security protection method is the old user plane security protection method or the user plane security protection method indicated by the first indication information in the embodiments, the first user plane security key is the new user plane security key or the to-be-used user plane security key in the embodiments, and the second user plane security key is the old user plane security key or the user plane security key stored in the suspend process in the embodiments.

It should be noted that in the following embodiments of this application, names of messages between network elements, names of parameters in messages, or the like are merely examples, and there may be other names during other implementations. This is not specifically limited in the embodiments of this application.

Figure 5A:
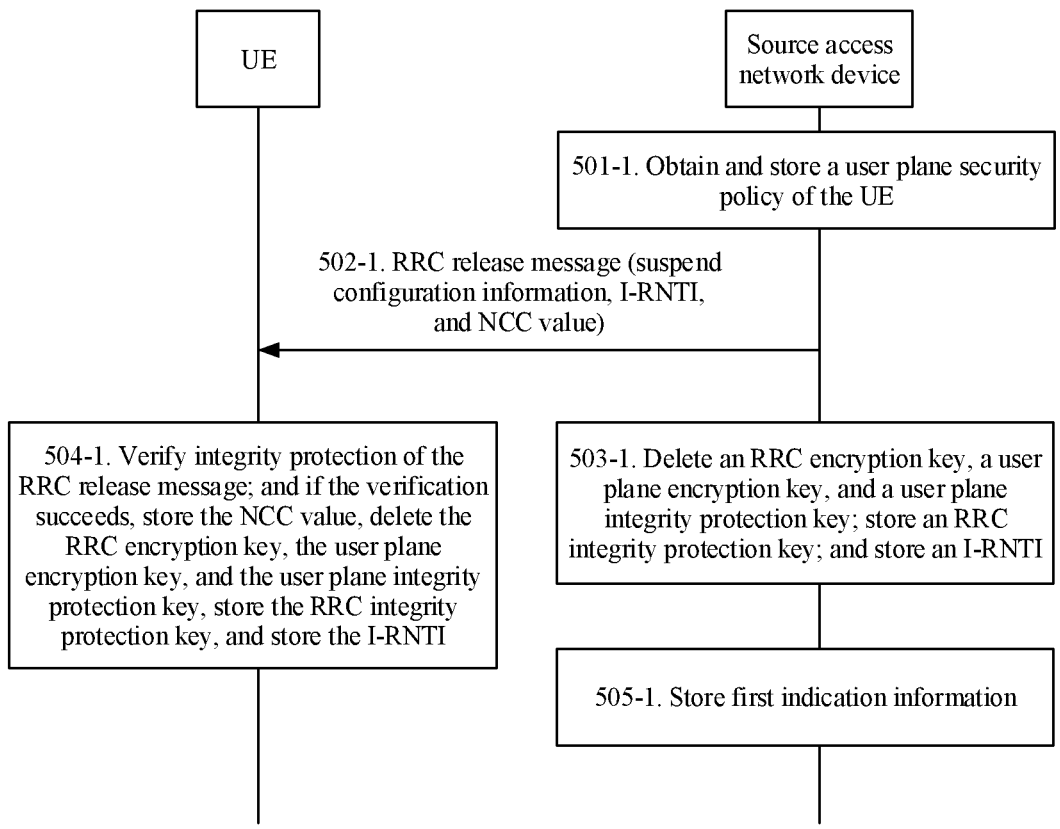
FIG. 5A is a schematic flowchart of a communication method according to Embodiment 1 of this application.

FIG. 5A is a schematic flowchart of a communication method according to Embodiment 1 of this application. This embodiment mainly describes how to process a user plane security policy in a suspend process. In the embodiment shown in FIG. 5A, step 505-1 is added based on the schematic procedure shown in FIG. 2. The source access network device stores first indication information. The embodiment shown in FIG. 5A may include but is not limited to the following steps.

Step 501-1. The source access network device obtains and stores a user plane security policy of UE.

The source access network device obtains and stores the user plane security policy of the UE, to be more specific, when the source access network device is in a connected state, the source access network device obtains and stores the user plane security policy for the UE from an SMF or obtains the user plane security policy from another base station in a switch procedure. An advantage of storing the user plane security policy by the source access network device is that the source access network device conveniently determines a user plane security protection method between the source access network device and the UE. When the source access network device does not perform step 505-1, the source access network device may determine the user plane security protection method between the source access network device and the UE based on the user plane security policy.

When storing the user plane security policy, the source access network device may further store granularity information corresponding to the user plane security policy. The granularity information refers to an applicable scope of the user plane security protection method. The granularity information may be a PDU session ID, that is, different PDU sessions may correspond to different user plane security policies; or may be a radio bearer identity (e.g., a data radio bearer identity (DRB) identity (ID)), a network slice identifier, a data network name, or the like. For example, different DRB may correspond to different user plane security policies. The granularity information may further include a plurality of types of the PDU session ID, the DRB ID, the network slice identifier, the data network name, and the like. For example, the granularity information includes the PDU session ID and the DRB ID. It should be noted that when the granularity information is bound to the user plane security policy, a correspondence may be a one-to-one correspondence or a one-to-many correspondence. For example, one PDU session corresponds to one user plane security policy, or a plurality of PDU sessions may correspond to a same user plane security policy. For another example, one DRB ID corresponds to one user plane security policy, or a plurality of DRB IDs correspond to a same user plane security policy. Currently, one PDU session corresponds to a plurality of DRB IDs, and the plurality of DRB IDs corresponding to the PDU session may correspond to a same user plane security policy, that is, the user plane security policy corresponding to the PDU session.

An advantage of storing the user plane security policy and the corresponding granularity information by the source access network device is that when the source access network device enters the connected state from an inactive state, and learns of granularity information of uplink user plane data sent by the UE, the source access network device may determine a corresponding user plane security policy based on the granularity information, then determine the user plane security protection method, and further perform security deprotection on the uplink user plane data.

If the source access network device generates and uses a user plane security activation result (or a security result), the source access network device stores the security result.

Step 502-1. The source access network device sends an RRC release message to the UE. Correspondingly, the UE receives the RRC release message from the source access network device.

Step 503-1. After sending the RRC release message, the source access network device deletes an RRC encryption key, a user plane encryption key, and a user plane integrity protection key, stores an RRC integrity protection key, and stores an I-RNTI.

Further, the source access network device deactivates user plane security. Activation and deactivation of user plane security are associated with a user plane key. Because the source access network device deletes the user plane security key, the source access network device needs to deactivate user plane security. A specific implementation method is not limited herein. In other words, the source access network device may delete the user plane security key because the source access network device determines to deactivate user plane security.

Step 504-1. After receiving the RRC release message, the UE verifies integrity protection of the RRC release message. If the verification succeeds, the UE stores an NCC value, deletes the RRC encryption key, the user plane encryption key, and the user plane integrity protection key, and stores the RRC integrity protection key.

For implementation processes of step 502-1 to step 504-1, refer to the descriptions of step 202 to step 204 in the procedure shown in FIG. 2. Details are not described herein again.

It also should be emphasized herein that the UE deactivates user plane security. For example, an activation state of the user plane security of the UE is bound to a user plane security key of the UE. Because the UE deletes the user plane key, the UE deactivates user plane security. A specific implementation method is not limited herein. In other words, the UE may delete the user plane security key because the UE determines to deactivate user plane security.

Step 505-1. The source access network device stores the first indication information, where the first indication information includes user plane security activation method indication information and/or user plane security protection method indication information.

The user plane security activation method indication information is used to indicate whether to enable user plane encryption protection and user plane integrity protection; is sent, using an RRC message, by the source access network device to the UE when the UE and the source access network device are in the connected state; and is used to indicate a user plane security protection method to be activated. A specific indication depends on a user plane security protection method activated by the source access network device when the source access network device and the UE are in the connected state. The user plane security activation method indication information may be the user plane activation indication information carried in the RRC connection reconfiguration message in step 106 in FIG. 1. The source access network device stores the user plane security activation method indication information, such that the source access network device can use the user plane security activation method indication information in a resume process.

The user plane security protection method indication information is indication information newly generated by the source access network device based on a user plane security protection method currently used by the UE to protect data, and is used to indicate whether user plane encryption protection is enabled and whether user plane integrity protection is enabled. The source access network device stores the user plane security protection method indication information, such that the source access network device can use the user plane security protection method indication information in the resume process.

The first indication information may alternatively be an enhancement of the security result. In other approaches, the security result is optionally generated and optionally used. The security result may be generated only when the user plane security policy includes PREFERRED. It may further be stipulated in this embodiment of this application that a security result needs to be generated regardless of whether the user plane security policy includes PREFERRED. An existing format may be used for the security result, or the format of the security result may be updated to ENUMERATED (enabled, disabled . . . ).

Both the user plane security activation method indication information and the user plane security protection method indication information may indicate, when the source access network device enters the inactive state, a user plane security protection method used before the source access network device and the UE enter the inactive state from the connected state. The user plane security activation method indication information is transmitted by the access network device to the UE. It may be understood that the UE does not need to generate the user plane security activation method indication information, but only needs to receive the user plane security activation method indication information. The user plane security activation method indication information is transferred in an RRC message, and is transmitted in the RRC connection reconfiguration message (referring to step 106). However, the user plane security protection method indication information does not need to be transferred, and needs to be separately generated by the access network device and the UE.

An advantage of storing the first indication information by the source access network device is that it can be ensured that the user plane security protection method used before the source access network device enters the inactive state from the connected state is consistent with that used after the source access network device enters the inactive state from the connected state.

In a possible implementation, when storing the first indication information, the source access network device further stores granularity information corresponding to the first indication information. The granularity information refers to an applicable scope of the user plane security protection method. The granularity information may be a PDU session ID. Different PDU sessions may correspond to different first indication information, DRB IDs, network slice identifiers, data network names, or the like. For example, different DRBs may correspond to different first indication information. The granularity information may further include a plurality of types of the PDU session ID, the DRB ID, the network slice identifier, the data network name, and the like. For example, the granularity information includes the PDU session ID and the DRB ID.

It should be noted that when the granularity information is bound to the first indication information, a correspondence may be a one-to-one correspondence or a one-to-many correspondence. For example, one PDU session corresponds to one piece of first indication information, or a plurality of PDU sessions may correspond to same first indication information. For another example, one DRB ID corresponds to one piece of first indication information, or a plurality of DRB IDs correspond to same first indication information. Currently, one PDU session corresponds to a plurality of DRB IDs, and the plurality of DRB IDs corresponding to the PDU session may correspond to same first indication information, that is, the first indication information corresponding to the PDU session.

An advantage of storing the first indication information and the granularity information corresponding to the first indication information by the source access network device is that when the source access network device enters the connected state from the inactive state, and learns of the granularity information of the uplink user plane data sent by the UE, the source access network device may determine a corresponding user plane security protection method based on the granularity information, and further perform security deprotection on the uplink user plane data.

It should be noted that step 505-1 may be performed after step 503-1, or may be performed between step 502-1 and step 503-1, or may be performed in a process of performing step 503-1. In the embodiment shown in FIG. 5A, an example in which step 505-1 is performed after step 503-1 is used for description, and the example does not constitute a limitation on this embodiment of this application.

In the embodiment shown in FIG. 5A, the source access network device stores the first indication information after sending the RRC release message, such that it can be ensured that the user plane security protection method used before the source access network device enters the inactive state from the connected state is consistent with that used after the source access network device enters the inactive state from the connected state. Further, it may be convenient for the source access network device to determine, based on the first indication information, whether to store the user plane security key. Details are described in the embodiment shown in FIG. 6. The source access network device stores the first indication information, but the UE does not store the first indication information. After the UE sends an RRC resume request message, the source access network device may notify, after determining the user plane security protection method, the UE of the determined user plane security protection method using second indication information.

Further, when the user plane security policy does not include PREFERRED, to be more specific, the user plane encryption protection policy is not PREFERRED or the user plane integrity protection policy is not PREFERRED, or neither the user plane encryption protection policy nor the user plane integrity protection policy is PREFERRED, the source access network device may store only the user plane security policy, that is, only performs step 501-1. When the user plane security policy includes PREFERRED, to be more specific, the user plane encryption protection policy is PREFERRED or the user plane integrity protection policy is PREFERRED, or both the user plane encryption protection policy and the user plane integrity protection policy are PREFERRED, the source access network device needs to store the user plane security policy and the first indication information, that is, performs step 501-1 and step 505-1. In this way, in a resume process, when an access network device cannot accurately determine a user plane security protection method between the access network device and the UE based on the user plane security policy includes PREFERRED, the access network device may determine the user plane security protection method between the access network device and the UE based on the first indication information. The access network device is a base station to which the UE resumes an RRC connection, and may be a source access network device or a target access network device.

Figure 5B:
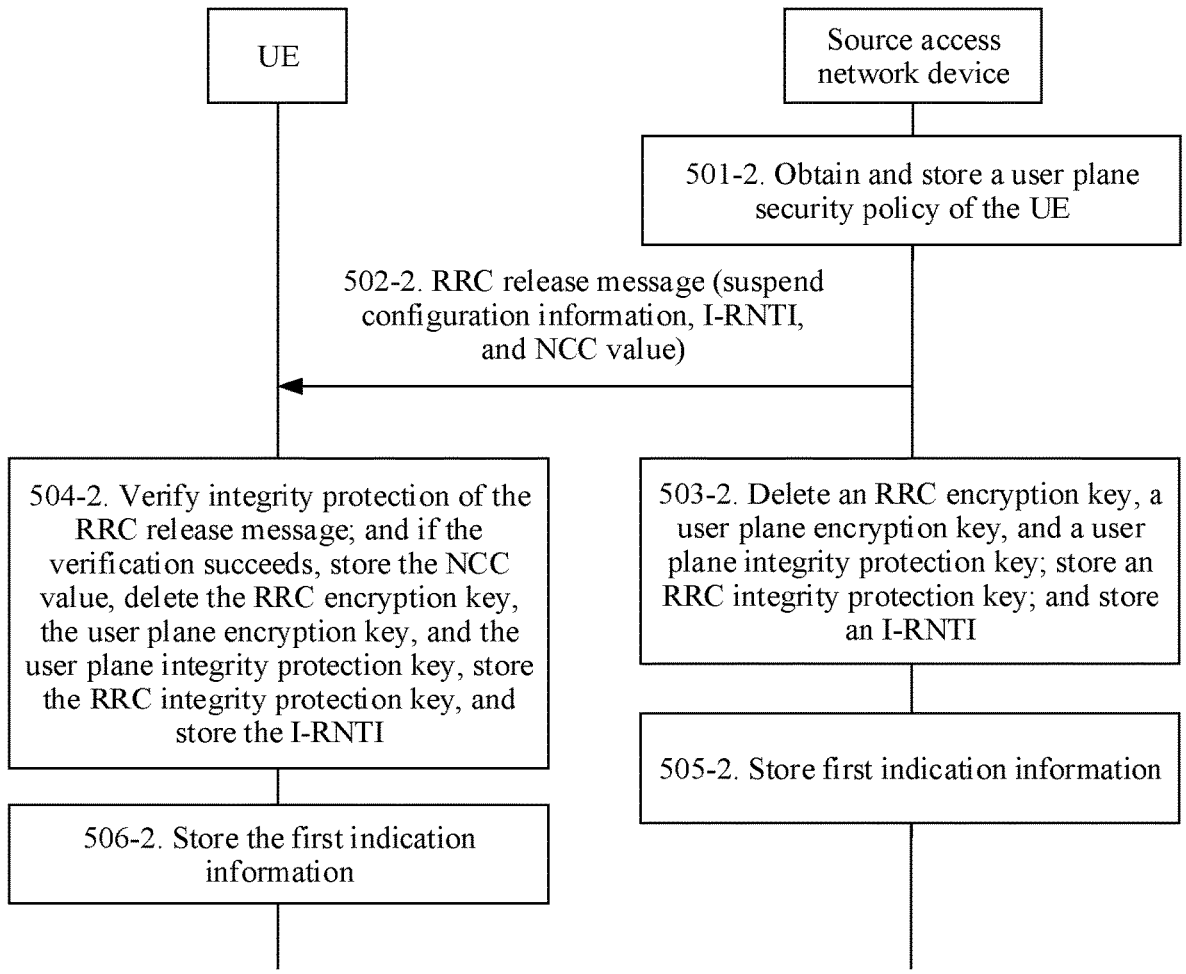
FIG. 5B is a schematic flowchart of a communication method according to Embodiment 2 of this application.

FIG. 5B is a schematic flowchart of a communication method according to Embodiment 2 of this application. This embodiment mainly describes how to process a user plane security policy in a suspend process. Based on the embodiment shown in FIG. 5A, step 506-2 is added in the embodiment shown in FIG. 5B, to be more specific, UE stores first indication information. In other words, in the embodiment shown in FIG. 5B, both the UE and a source access network device store the first indication information, while in the embodiment shown in FIG. 5A, only the source access network device stores the first indication information. The embodiment shown in FIG. 5B may include but is not limited to the following steps.

Step 501-2. The source access network device obtains and stores a user plane security policy of the UE.

Step 502-2. The source access network device sends an RRC release message to the UE. Correspondingly, the UE receives the RRC release message from the source access network device.

Step 503-2. After sending the RRC release message, the source access network device deletes an RRC encryption key, a user plane encryption key, and a user plane integrity protection key, stores an RRC integrity protection key, and stores an I-RNTI.

Step 504-2. After receiving the RRC release message, the UE verifies integrity protection of the RRC release message. If the verification succeeds, the UE stores an NCC value, deletes the RRC encryption key, the user plane encryption key, and the user plane integrity protection key, and stores the RRC integrity protection key.

Step 505-2. The source access network device stores the first indication information, where the first indication information includes user plane security activation method indication information and/or user plane security protection method indication information.

For step 501-2 and step 505-2, refer to the descriptions of step 501-1 and step 505-1 in the embodiment shown in FIG. 5A. For implementation processes of step 502-2 to step 504-2, refer to the descriptions of step 202 to step 204 in the procedure shown in FIG. 2 and the descriptions of step 502-1 to step 504-1 in the procedure shown in FIG. 5A. Details are not described herein again.

Step 506-2. The UE stores the first indication information, where the first indication information includes the user plane security activation method indication information and/or the user plane security protection method indication information.

The user plane security activation method indication information is user plane activation indication information carried by the source access network device in step 106 in FIG. 1 when the UE and the source access network device are in a connected state. For example, if the user plane integrity protection activation indication information included in the RRC connection reconfiguration message in step 106 in FIG. 1 is "enable", and the RRC connection reconfiguration message does not include the user plane encryption protection activation indication information, the UE may determine to enable user plane encryption protection and user plane integrity protection. After receiving the RRC release message, the UE records user plane integrity protection as "enable". This record indicates that both user plane integrity protection and user plane encryption protection are enabled. In this case, the user plane security activation method indication information stored in the UE is used to indicate to enable user plane encryption protection and user plane integrity protection. For another example, if the user plane encryption protection activation indication information included in the RRC connection reconfiguration message in step 106 in FIG. 1 is "disable", and the RRC connection reconfiguration message does not include the user plane integrity protection activation indication information, the UE may determine not to enable user plane encryption protection and user plane integrity protection. After receiving the RRC release message, the UE records user plane integrity protection as "disable". This record indicates that neither user plane integrity protection nor user plane encryption protection is enabled. In this case, the user plane security activation method indication information stored in the UE is used to indicate not to enable user plane encryption protection and user plane integrity protection. For another example, if the user plane integrity protection activation indication information included in the RRC connection reconfiguration message in step 106 in FIG. 1 is "enable", and the user plane encryption protection activation indication information is "disable", the UE may determine not to enable user plane encryption protection and determine to enable user plane integrity protection. After receiving the RRC release message, the UE records user plane integrity protection as "enable" and user plane encryption protection as "disable". This record indicates that user plane integrity protection is enabled and user plane encryption protection is not enabled. In this case, the user plane security activation method indication information stored in the UE is used to indicate not to enable user plane encryption protection and to enable user plane integrity protection.

In the foregoing three examples, the information recorded by the UE indicates the user plane security activation method indication information. For example, if the information recorded by the UE is that user plane integrity protection is "enable" and user plane encryption protection is "disable", the indicated user plane security activation method indication information is used to indicate not to enable user plane encryption protection and to enable user plane integrity protection. For another example, the information recorded by the UE is that user plane encryption protection is "disabled", and the indicated user plane security activation method indication information is used to indicate that neither user plane encryption protection nor user plane integrity protection is enabled. In addition to this recording manner, the user plane security activation method indication information may further be recorded or indicated using two bits. For example, "01" indicates that user plane encryption protection is enabled and user plane integrity protection is disabled. A specific recording manner of the UE and a specific indication manner of the user plane security activation method indication information are not limited in this embodiment of this application.

The user plane security protection method indication information is generated by the UE based on a user plane security protection method currently used by the UE to protect data, or is generated by the UE based on a user plane security protection method used by the UE to protect data before the UE enters an inactive state from the connected state. In other words, the user plane security protection method indication information is used to indicate the user plane security protection method currently used by the UE, or indicate the user plane security protection method used before the UE enters the inactive state from the connected state. For an example representation form of the user plane security protection method indication information, refer to a storage form of the user plane security activation method indication information recorded by the UE. The indication information may be explicitly stored on a source access network device side, or may be implicitly reflected by storing DRB configuration information. In other words, the first indication information may be related DRB configuration information. An access network device may know a to-be-used user plane security protection method based on the DRB configuration information.

An advantage of storing the first indication information by the UE is that it can be ensured that the user plane security protection method used before the UE enters the inactive state from the connected state is consistent with that used after the UE enters the inactive state from the connected state.

In a possible implementation, when storing the first indication information, the UE further stores granularity information corresponding to the first indication information. This process is the same as step 505-1 in which the source access network device stores the first indication information and the granularity information corresponding to the first indication information. An advantage of storing, by the UE, the first indication information and the granularity information corresponding to the first indication information is that after the UE enters the connected state from the inactive state, when the UE needs to send uplink user plane data, the UE may determine, based on granularity information of the to-be-sent uplink user plane data, a user plane security protection method corresponding to the granularity information, and then perform security protection on the uplink user plane data according to the user plane security protection method.

It should be noted that step 506-2 may be performed after step 504-2, or may be performed between step 502-2 and step 504-2, or may be performed in a process of performing step 504-2. In the embodiment shown in FIG. 5B, an example in which step 505-2 is performed after step 504-2 is used for description, and the example does not constitute a limitation on this embodiment of this application.

In the embodiment shown in FIG. 5B, both the UE and the source access network device store the first indication information, such that it can be ensured that a user plane security protection method used before the UE and the source access network device enter the inactive state from the connected state is consistent with that used after the UE and the source access network device enter the inactive state from the connected state. Further, it may be convenient for the source access network device and the UE to determine, based on the first indication information, whether to store the user plane security key. Details are described in the embodiment shown in FIG. 6.

When both the UE and the source access network device store the first indication information, the UE and the source access network device may store the user plane security protection method in different manners. This means that the first indication information stored in step 506-2 may be the same as or different from the first indication information stored in step 505-2. For example, the first indication information stored in step 506-2 is the user plane activation indication information in step 106, but the first indication information stored in step 505-2 is an enhanced security result. Therefore, a main objective of this embodiment is to describe that the UE side also stores indication information having a same function as the first indication information. For example, content of the indication information stored in the UE and the source access network device may be the same or may be different. This is not limited in the present disclosure. For example, the UE stores the user plane security activation method indication information, and the source access network device stores the user plane security protection method indication information. The user plane security protection method may also be stored in a same manner.

Based on the embodiment shown in FIG. 5B, another implementation method for implementing that the source access network device and the UE store the user plane security protection method is that the source access network device and the UE negotiate a user plane security protection method. The negotiated user plane security protection method is used to determine a user plane security protection method that should be used in a process in which the UE and the source access network device enter the connected state again. The negotiated user plane security protection method may be the same as or different from the current user plane security protection method.

A feasible implementation method is that the RRC release message in step 502-2 may carry new user plane security activation method indication information and/or use indication information. The new user plane security activation method indication information indicates a user plane security protection method that should be used when the UE enters the connected state again. The use indication information indicates a case in which the UE can use the user plane security protection method indicated in step 502-2. If there is no new user plane security activation method indication information in step 502-2, the UE may protect early data transfer using a user plane security protection method used before the UE enters the inactive state, or the UE may protect early data transfer using a user plane security protection method obtained from a core network.

For content of the carried new user plane security activation method indication information, refer to the user plane security activation method indication information. The use indication information may indicate, after the UE enters the connected state from the inactive state, whether the user plane security protection method can be used to protect only early data transfer, or can be used to protect user plane data transmission only after the UE enters the connected state, or can be used to protect both early data transfer and user plane data transmission after the UE enters the connected state. For example, this information can be transferred in an enumerable message format. Therefore, in step 504-2 and step 506-2, the source access network device and the UE each only need to determine, based on the newly negotiated user plane security protection method, to store the first indication information.

In the embodiment shown in FIG. 5B, both the UE and the source access network device store the first indication information. In a special case, neither the source access network device nor the UE stores the first indication information. In a process in which both the source access network device and the UE enter the inactive state from the connected state, there is a fixed user plane security protection method. In this case, when the source access network device and the UE enter the inactive state from the connected state, the fixed user plane security protection method may be directly used. For example, the fixed user plane security protection method is not enabling user plane encryption protection, but enabling user plane integrity protection. In this method, the source access network device may store a user plane security policy obtained from an SMF, such that after the UE returns to the connected state, the source access network device may activate user plane security between the source access network device and the UE according to the user plane security policy.

Figure 6:
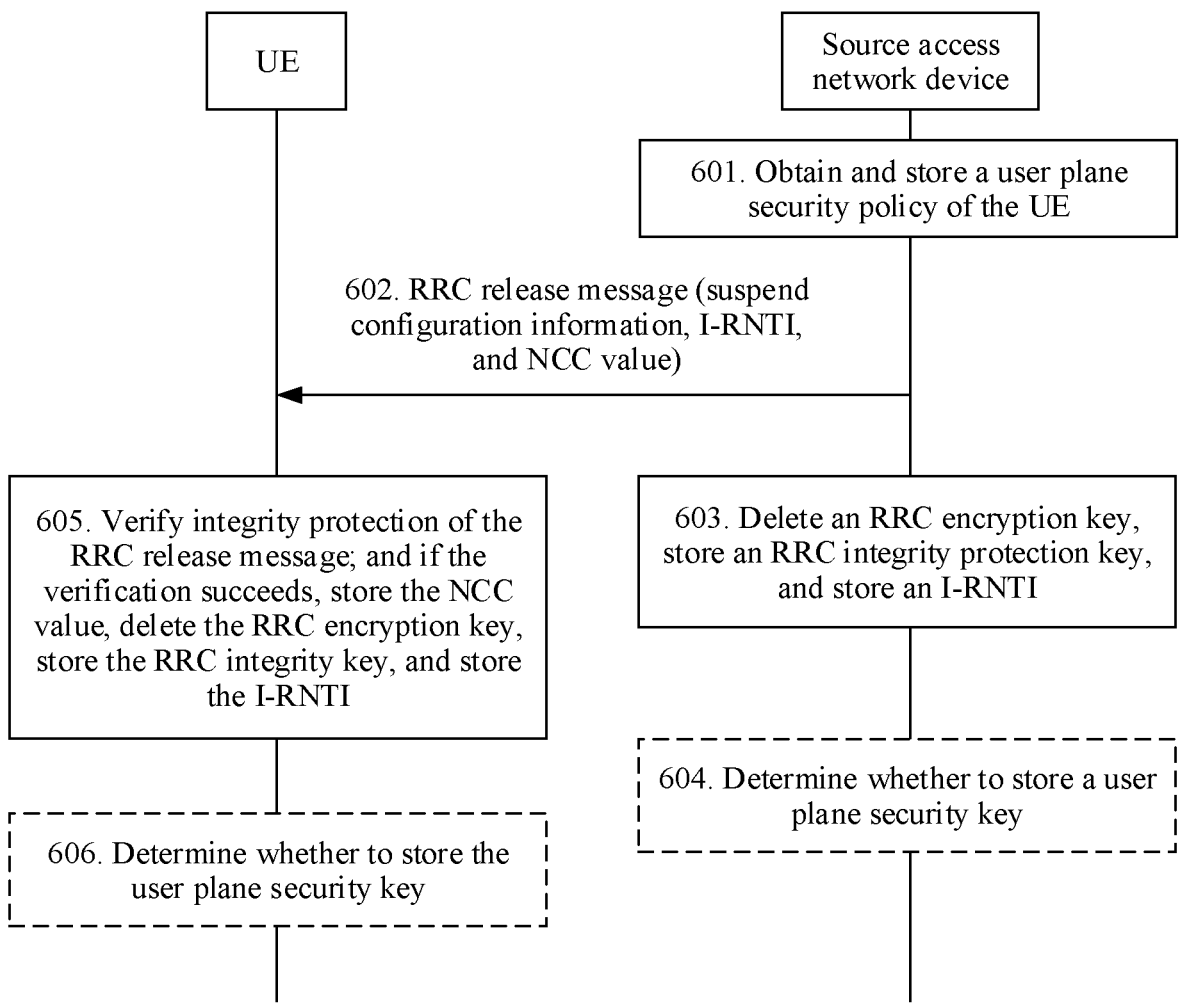
FIG. 6 is a schematic flowchart of a communication method according to Embodiment 3 of this application.

FIG. 6 is a schematic flowchart of a communication method according to Embodiment 3 of this application. This embodiment mainly describes how to process a user plane security policy in a suspend process. Based on the procedure shown in FIG. 2, a step of determining, by a source access network device and/or a UE, whether to store a user plane security key is added in the embodiment shown in FIG. 6. In other words, in the embodiment shown in FIG. 6, whether to delete the user plane encryption key and the user plane integrity protection key needs to be determined. However, in the procedure shown in FIG. 2, the source access network device and the UE directly delete the user plane encryption key and the user plane integrity protection key. The embodiment shown in FIG. 6 may include but is not limited to the following steps.

Step 601. The source access network device obtains and stores a user plane security policy of the UE. For an implementation process of step 601, refer to the description of step 501-1 in the embodiment shown in FIG. 5A. Details are not described herein again.

Step 602. The source access network device sends an RRC release message to the UE. Correspondingly, the UE receives the RRC release message from the source access network device. For an implementation process of step 602, refer to the description of step 202 in the procedure shown in FIG. 2. Details are not described herein again.

Step 603. After sending the RRC release message, the source access network device deletes an RRC encryption key, stores an RRC integrity protection key, and stores an I-RNTI.

Step 604. The source access network device determines whether to store a user plane security key, to be more specific, determines whether to store the user plane encryption key and the user plane integrity protection key.

The source access network device may determine, in the following several manners, whether to store the user plane security key.

Manner 1: If a fixed user plane security protection method is used after the source access network device and the UE enter a connected state using a resume message, the source access network device determines, in a suspend process, to store the user plane security key corresponding to the method of the source access network device. The fixed user plane security protection method may be performing only user plane integrity protection, or performing only user plane encryption protection, or performing both user plane encryption protection and user plane integrity protection. Correspondingly, the source access network device stores only the user plane integrity protection key, or stores only the user plane encryption key, or stores both the user plane integrity protection key and the user plane encryption key. Correspondingly, after the UE enters the connected state using the RRC resume message, the source access network device uses only a user plane integrity protection key, or uses only a user plane encryption protection key, or uses both a user plane encryption protection key and a user plane integrity protection key to deprotect a received user plane message.

Manner 2: When the source access network device stores only the user plane security policy, that is, performs execution according to the procedure shown in FIG. 2, the source access network device further stores a currently used user plane security key in addition to the user plane security policy. As such, the source access network device can better determine the user plane security protection method after entering the connected state. An advantage of this method is that when both a user plane encryption protection policy and a user plane integrity protection policy that are included in the user plane security policy are PREFERRED, it is difficult to directly determine a previously used user plane security protection method based on the user plane security policy. Therefore, when the user plane security policy is stored, the currently used user plane security key is also stored, such that the source access network device can learn of the previous user plane security protection method. The user plane security key currently used by the source access network device is a user plane security key used by the source access network device and the UE to protect user plane security before the source access network device sends the RRC release message.

Manner 3: When the source access network device stores first indication information, that is, when the source access network device performs step 505-1 or step 505-2, the source access network device determines, based on the first indication information, whether to store the user plane security key, to be more specific, determines, according to the user plane security protection method indicated by the first indication information, whether to store the user plane encryption key and the user plane integrity protection key. For example, if the first indication information indicates that user plane encryption protection is enabled and user plane integrity protection is not enabled, the source access network device stores the user plane encryption key and deletes the user plane integrity protection key.

Manner 4: If the source access network device stores a user plane resource related to granularity information, the source access network device may determine, based on a user plane security protection method corresponding to the user plane resource, whether to store the user plane encryption key and the user plane integrity protection key.

Manner 5: If the source access network device and the UE newly negotiate a user plane security protection method, the source access network device may determine, based on the newly negotiated user plane security protection method, whether to store the user plane encryption key and the user plane integrity protection key.

Because the source access network device stores the user plane security key, the source access network device retains related DRB configuration information of the user plane security activation method. It may be understood that the source access network device stores the related DRB configuration information of the user plane security activation method and the user plane security key together in the source access network device.

Step 605. After receiving the RRC release message, the UE verifies integrity protection of the RRC release message. If the verification succeeds, the UE stores an NCC value, deletes the RRC encryption key, and stores the RRC integrity protection key.

Step 606. The UE determines whether to store a user plane security key, to be more specific, determines whether to store the user plane encryption key and the user plane integrity protection key.

The UE may determine, in the following several manners, whether to store the user plane security key.

Manner 1: The UE stores the user plane security key regardless of a user plane security key used before the UE enters an inactive state. In this manner, the UE reactivates the user plane security protection method in an RRC resume process. A user plane security key used in the newly activated user plane security protection method may be the same as or different from that used before the UE enters the inactive state.

Manner 2: The UE may determine to store only the user plane encryption key, or store only the user plane integrity protection key, or store both the user plane encryption key and the user plane integrity protection key. In addition, the stored content is consistent with that on a source access network device side. For example, both the UE and the source access network device store only the user plane encryption key. The user plane security key stored in this manner may be used to protect early data transfer.

Manner 3: The UE may determine a to-be-stored key based on the current user plane security protection method. For example, before entering the inactive state, if the UE enables only user plane encryption protection, the UE needs to store the user plane encryption key, and may delete or store the user plane integrity protection key; if the UE enables only user plane integrity protection, the UE needs to store the user plane integrity protection key, and may store or delete the user plane encryption key; or if the UE enables both user plane integrity protection and user plane encryption protection, the UE needs to store both the user plane encryption key and the user plane integrity protection key.

Manner 4: When the UE stores the first indication information, that is, when the UE performs step 506-2, the UE determines a to-be-stored user plane security key based on the first indication information. For example, if the first indication information indicates that only user plane encryption protection is enabled, the user plane encryption key needs to be stored, and the user plane integrity protection key may be deleted or stored; if user plane security activation method indication information and/or user plane security protection method indication information indicate/indicates that only user plane integrity protection is enabled, the user plane integrity protection key needs to be stored, and the user plane encryption key may be stored or deleted; or if user plane security activation method indication information and/or user plane security protection method indication information indicate/indicates that both user plane integrity protection and user plane encryption protection are enabled, both the user plane encryption key and the user plane integrity protection need to be stored.

For Manner 4, storing the first indication information and determining whether to store the user plane security key may be simultaneously performed; or the first indication information may be stored first, and then whether to store the user plane security key is determined; or whether to store the user plane security key may be determined first, and then the first indication information is stored.

If storing the first indication information and determining whether to store the user plane security key are simultaneously performed, the UE determines, based on the user plane activation indication information carried in step 106 in FIG. 1, or the currently used user plane security protection method, or a user plane security protection method used when the UE enters the inactive state from the connected state, whether to store the user plane encryption key and the user plane integrity protection key; and generates and stores the user plane security activation method indication information and/or the user plane security protection method indication information. The simultaneous execution herein means that determining the user plane security key is not directly related to generating and storing the user plane security activation method indication information and/or the user plane security protection method indication information.

If the first indication information is stored first, and then whether to store the user plane security key is determined, the UE generates and stores the user plane security activation method indication information based on the user plane activation indication information carried in step 106 in FIG. 1, and generates and stores the user plane security protection method indication information based on the currently used user plane security protection method or the user plane security protection method used when the UE enters the inactive state from the connected state. Then, the UE determines, based on the user plane security activation method indication information and/or the user plane security protection method indication information, whether to store the user plane encryption key and the user plane integrity protection key. It can be learned that in this case, the UE generates and stores the user plane security protection method indication information based on the user plane security protection method, and determines whether to store the to-be-protected user plane security key.

If whether to store the user plane security key is determined first, and then the first indication information is stored, the UE determines, based on the user plane activation indication information carried in step 106 in FIG. 1, or the currently used user plane security protection method, or a user plane security protection method used when the UE enters the inactive state from the connected state, whether to store the user plane encryption key and the user plane integrity protection key; and further generates and stores the user plane security activation method indication information and/or the user plane security protection method indication information based on the determined stored user plane security key. It can be learned that in this case, the UE first determines the to-be-stored user plane security key, then further generates and stores the user plane security protection method indication information based on the stored key, and determines the to-be-protected user plane security key.

Because the UE stores the user plane security key, the UE retains related DRB configuration information of the user plane security activation method. It may be understood that the UE stores the related DRB configuration information of the user plane security activation method and the user plane security key together in the UE.

It should be noted that a sequence of performing step 605 and step 606 is not limited in this embodiment of this application. Step 605 and step 606 may be performed at a same time, or step 605 may be performed before step 606, or step 606 may be performed before step 605.

It should be noted that determining, by the source access network device, whether to store the user plane security key may be synchronous with determining, by the UE, whether to store the user plane security key, in other words, step 604 and step 606 are performed, or step 604 and step 606 are not performed. Alternatively, determining, by the source access network device, whether to store the user plane security key may not be synchronous with determining, by the UE, whether to store the user plane security key, in other words, step 604 is performed but step 606 is not performed, to be more specific, the source access network device stores the user plane security key but the UE does not store the user plane security key; or step 606 is performed but step 604 is not performed, to be more specific, the UE stores the user plane security key but the source access network device does not store the user plane security key. If determining, by the source access network device, whether to store the user plane security key is not synchronous with determining, by the UE, whether to store the user plane security key, and backward compatibility of the UE and a base station is better considered, modification is minimized.

In the embodiment shown in FIG. 6, a step of determining, by the UE and/or the source access network device, whether to store the user plane security key is added in the suspend process, such that security protection and security deprotection can be quickly performed on user plane data in the resume process.

In the embodiment shown in FIG. 6, a step of whether to store the user plane security key may be added based on FIG. 2, or may be added based on FIG. 5A or FIG. 5B. For example, the UE determines, based on the stored first indication information, whether to store the user plane security key.

The embodiments shown in FIG. 5A, FIG. 5B, and FIG. 6 relate to the suspend process. The following describes the resume process. In the embodiments of this application, if the user plane security key is stored in the suspend process, the stored user plane security key is referred to as an old user plane security key, and the user plane security key generated in the resume process is referred to as a new user plane security key; and the user plane security protection method used in the suspend process is referred to as an old user plane security protection method, and the user plane security protection method re-determined in the resume process is referred to as a new user plane security protection method.

Figure 7A:
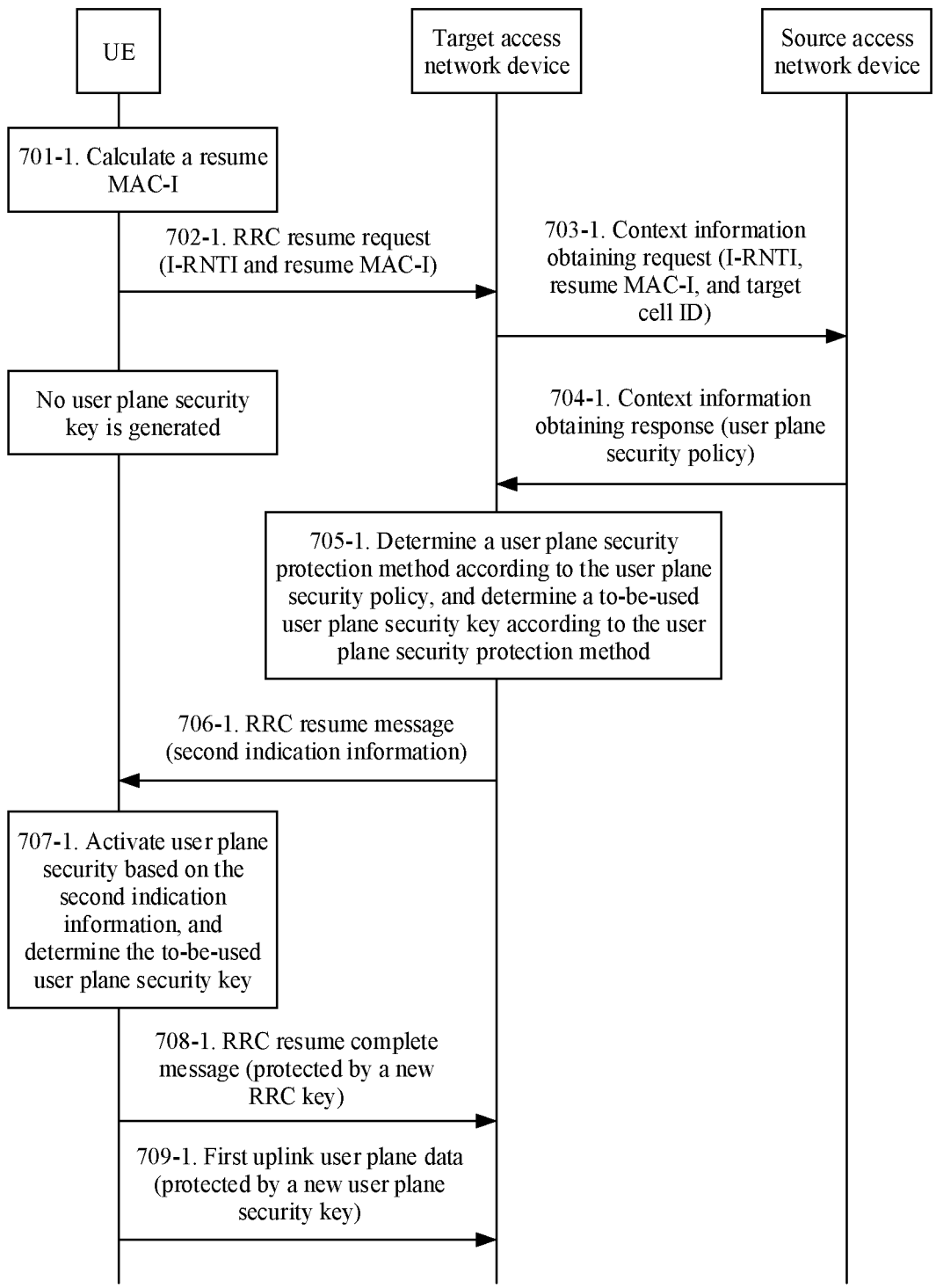
FIG. 7A is a schematic flowchart of a communication method according to Embodiment 4 of this application.

FIG. 7A is a schematic flowchart of a communication method according to Embodiment 4 of this application. This embodiment mainly describes how to perform security protection on user plane data in a resume process. The embodiment shown in FIG. 7A is based on the procedure shown in FIG. 2, to be more specific, neither a UE nor a source access network device stores first indication information in a suspend process. The embodiment shown in FIG. 7A may include but is not limited to the following steps.

Step 701-1. The UE calculates a resume MAC-I using an RRC integrity protection key stored in the suspend process.

Step 702-1. The UE sends an RRC resume request to a target access network device. Correspondingly, the target access network device receives the RRC resume request from the UE.

After sending the RRC resume request, the UE generates a new KgNB*, and generates a new RRC key using the new KgNB*. The new RRC key includes a new RRC encryption key and a new RRC integrity protection key.

In a possible implementation, after sending the RRC resume request, the UE does not generate a user plane security key, that is, as shown in FIG. 7A.

In another possible implementation, after sending the RRC resume request, the UE generates a new user plane security key. Details are described in step 802-1*a* shown in FIG. 8A.

For implementation processes of step 701-1 and step 702-1, refer to the descriptions of step 301 and step 302 in the embodiment shown in FIG. 3. However, in step 702-1, only the RRC key is generated, and the user plane security key is not generated.

Step 703-1. The target access network device sends a context information obtaining request to the source access network device. Correspondingly, the source access network device receives the context information obtaining request from the target access network device.

Step 704-1. The source access network device sends a context information obtaining response to the target access network device. Correspondingly, the target access network device receives the context information obtaining response from the source access network device.

For implementation processes of step 703-1 and step 704-1, refer to the descriptions of step 303 and step 304 in the embodiment shown in FIG. 3.

Step 705-1. If the target access network device supports an encryption algorithm and an integrity protection algorithm that are used by a source cell, the target access network device generates the new RRC key (including the new RRC encryption key and the new RRC integrity protection key) using the KgNB*, determines a user plane security protection method according to a user plane security policy, and determines a to-be-used user plane security key based on the user plane security protection method.

The target access network device determines the user plane security protection method between the target access network device and the UE based on the user plane security policy and a status of the target access network device. The status of the target access network device may include but is not limited to whether user plane encryption protection can be enabled, whether user plane integrity protection can be enabled, a current resource usage status, a current load status, a rate currently supported by the UE, and the like. For example, if a user plane encryption protection policy in the user plane security policy is REQUIRED, user plane integrity protection is PREFERRED, but the target access network device does not support enabling of user plane integrity protection, the user plane security protection method, determined by the target access network device, between the target access network device and the UE is to enable user plane encryption protection and not to enable user plane integrity protection. Correspondingly, the to-be-used user plane security key determined according to the user plane security protection method includes a user plane encryption key, and does not include a user plane integrity protection key.

The determining, by the target access network device, the user plane security key may be combined with or separated from user plane security activation. If the determining, by the target access network device, the user plane security key is combined with user plane security activation, the target access network device generates a new user plane security key based on the user plane security protection method and the KgNB*, and activates user plane security using a new user plane security protection method and a new user plane security key. The new user plane security key is the to-be-used user plane security key. For example, if the user plane security protection method indicated by the first indication information is to enable user plane integrity protection, but the target access network device does not support enabling user plane integrity protection, the re-determined user plane security protection method includes not enabling user plane integrity protection. Correspondingly, the new user plane security key does not include the user plane integrity protection key. If the determining, by the target access network device, the user plane security key is separated from user plane security activation, the target access network device may generate all user plane security keys before or after the user plane security activation, and then determine a to-be-used user plane security key according to the user plane security activation method. For example, if only user plane encryption protection is activated and user plane integrity protection is not activated during user plane security activation, the target access network device uses only the user plane encryption key and does not use the user plane integrity protection key. In this case, the user plane integrity protection key may be deleted or retained. This is not specified in this embodiment of this application. When determining the user plane security protection method and the to-be-used user plane security key, the target access network device may perform security deprotection on uplink user plane data using the user plane security protection method, the user plane security key, and the user plane security algorithm, and perform security protection on downlink user plane data.

After determining the user plane security protection method, the target access network device may activate user plane security using the user plane security protection method, and may activate the user plane security before sending an RRC resume message to the UE, or may activate the user plane security after sending an RRC resume message to the UE, for example, activate the user plane security between step 706-1 and step 708-1 or after step 708-1.

Optionally, after determining the user plane security protection method, the target access network device sends a user plane security activation result to an SMF. The user plane security activation result may be sent using a message in a path switch procedure, or may be sent using a message in another procedure, for example, using a handover request acknowledge transfer message. A specific bearer message is not limited in the present disclosure.

Step 706-1. The target access network device sends the RRC resume message to the UE, where the RRC resume message includes second indication information. Correspondingly, the UE receives the RRC resume message from the target access network device.

The second indication information is used to indicate the user plane security protection method determined by the target access network device, and indicates whether to enable user plane encryption protection and user plane integrity protection, and includes user plane encryption protection activation indication information and/or user plane integrity protection activation indication information. In a possible implementation, for example, if the user plane integrity protection activation indication information included in the second indication information is "enable", and the second indication information does not include the user plane encryption protection activation indication information, the second indication information is used to indicate to enable user plane integrity protection and user plane encryption protection. For another example, if the user plane integrity protection activation indication information included in the second indication information is "disable", and the second indication information does not include the user plane encryption protection activation indication information, the second indication information is used to indicate not to enable user plane integrity protection and user plane encryption protection. In another possible implementation, for example, if the user plane integrity protection activation indication information included in the second indication information is "enable", and the user plane encryption protection activation indication information included in the second indication information is "enable", the second indication information is used to indicate to enable user plane integrity protection and user plane encryption protection. For another example, if the user plane integrity protection activation indication information included in the second indication information is "disable", and the user plane encryption protection activation indication information included in the second indication information is "disable", the second indication information is used to indicate not to enable user plane integrity protection and user plane encryption protection. In addition to the foregoing manners for indicating the second indication information, two bits may further be used to record or indicate the second indication information. For example, "01" indicates that user plane encryption protection is enabled and user plane integrity protection is disabled. A specific recording manner of the UE and a specific indication manner of the second indication information are not limited in this embodiment of this application.

The target access network device includes the second indication information in the RRC resume message, such that the UE activates user plane security based on the second indication information.

The RRC resume message is security protected and integrity protected by a new RRC key generated the target access network device, that is, signaling plane protection is performed on the RRC resume message.

Step 707-1. The UE activates user plane security based on the second indication information, and determines a to-be-used user plane security key.

After receiving the RRC resume message, the UE verifies signaling plane security of the RRC resume message, generates all user plane security keys after the verification succeeds, and then further determines the to-be-used user plane security key based on a user plane security activation status or the second indication information. The user plane security activation status refers to how to activate user plane security before the UE enters a third state from a connected state. For example, if the UE generates the user plane encryption key and the user plane integrity protection key, and the user plane security activation status or the second indication information indicates that user plane encryption protection is enabled and user plane integrity protection is disabled, the UE uses only the user plane encryption key. The user plane integrity protection key may be deleted or retained. This is not limited in this embodiment of this application. Alternatively, the UE may directly determine the to-be-used user plane security key based on the user plane security activation status or the second indication information. For example, if the user plane security activation status or the second indication information indicates that user plane encryption protection is enabled and user plane integrity protection is disabled, the target access network device only needs to generate the user plane encryption key, and does not need to generate the user plane integrity protection key.

If the UE generates a new user plane security key after sending the RRC resume request, that is, performs step 802-1*a*, correspondingly, the UE needs to perform step 807-1.

Step 708-1. The UE sends an RRC resume complete message to the target access network device. Correspondingly, the target access network device receives the RRC resume complete message from the UE.

The RRC resume complete message is security protected and integrity protected by the RRC key generated in step 702-1, that is, signaling plane protection is performed on the RRC resume complete message.

Step 709-1. The UE sends first uplink user plane data to the target access network device. Correspondingly, the target access network device receives the first uplink user plane data from the UE.

The UE performs security protection on the uplink user plane data using the user plane security protection method determined based on the second indication information, a new user plane security key, and a user plane security algorithm, to obtain the first uplink user plane data. In other words, the first uplink user plane data is protected by the new user plane security key. In this way, when receiving the first uplink user plane data, the target access network device performs security deprotection on the first uplink user plane data using the user plane security protection method, the new user plane security key, and the user plane security algorithm, to obtain the uplink user plane data.

The user plane security algorithm may be stored in a suspend process, or may be negotiated by the UE and the target access network device in a resume process. A user plane security algorithm in which process is used is not limited in the embodiment shown in FIG. 7A and subsequent embodiments. The user plane security algorithm is omitted in a description process of a subsequent embodiment. Actually, the user plane security protection method, the user plane security key, and the user plane security algorithm are required to perform security protection on the uplink user plane data. The UE and the target access network device may negotiate a signaling plane security algorithm and/or a user plane security algorithm in the resume process, or a negotiated security algorithm may be used for both a signaling plane and a user plane.

Step 709-1 is uplink transmission. For downlink transmission, when receiving downlink user plane data, the target access network device performs security protection on the downlink user plane data using the user plane security protection method, the new user plane security key, and the user plane security algorithm, to obtain first downlink user plane data; and sends the first downlink user plane data to the UE. In this way, when receiving the first downlink user plane data, the UE performs security deprotection on the first downlink user plane data using the user plane security protection method, the new user plane security key, and the user plane security algorithm, to obtain the downlink user plane data.

In the embodiment shown in FIG. 7A, when neither the UE nor the source access network device stores the first indication information in the suspend process, and whether to store the user plane security key is not determined, the target access network device determines the user plane security protection method according to the user plane security policy, generates a new user plane security key, and sends the second indication information to the UE using the RRC resume message, such that the UE generates a new user plane security key and activates user plane security. In this embodiment, it is specified that when receiving the second indication information, the UE activates user plane security, and sends the uplink user plane data. After receiving the user plane security policy, the target access network device may activate user plane security, thereby ensuring user plane data transmission security in the resume process.

It may be understood that the user plane security protection method determined by the target access network device according to the user plane security policy is a new user plane security protection method, and may be the same as or different from the user plane security protection method indicated by the first indication information. In a description process of a subsequent embodiment, the user plane security protection method indicated by the first indication information is referred to as an old user plane security protection method, and a user plane security protection method that is determined by the target access network device based on information other than the first indication information is referred to as a new user plane security protection method.

Figure 7B:
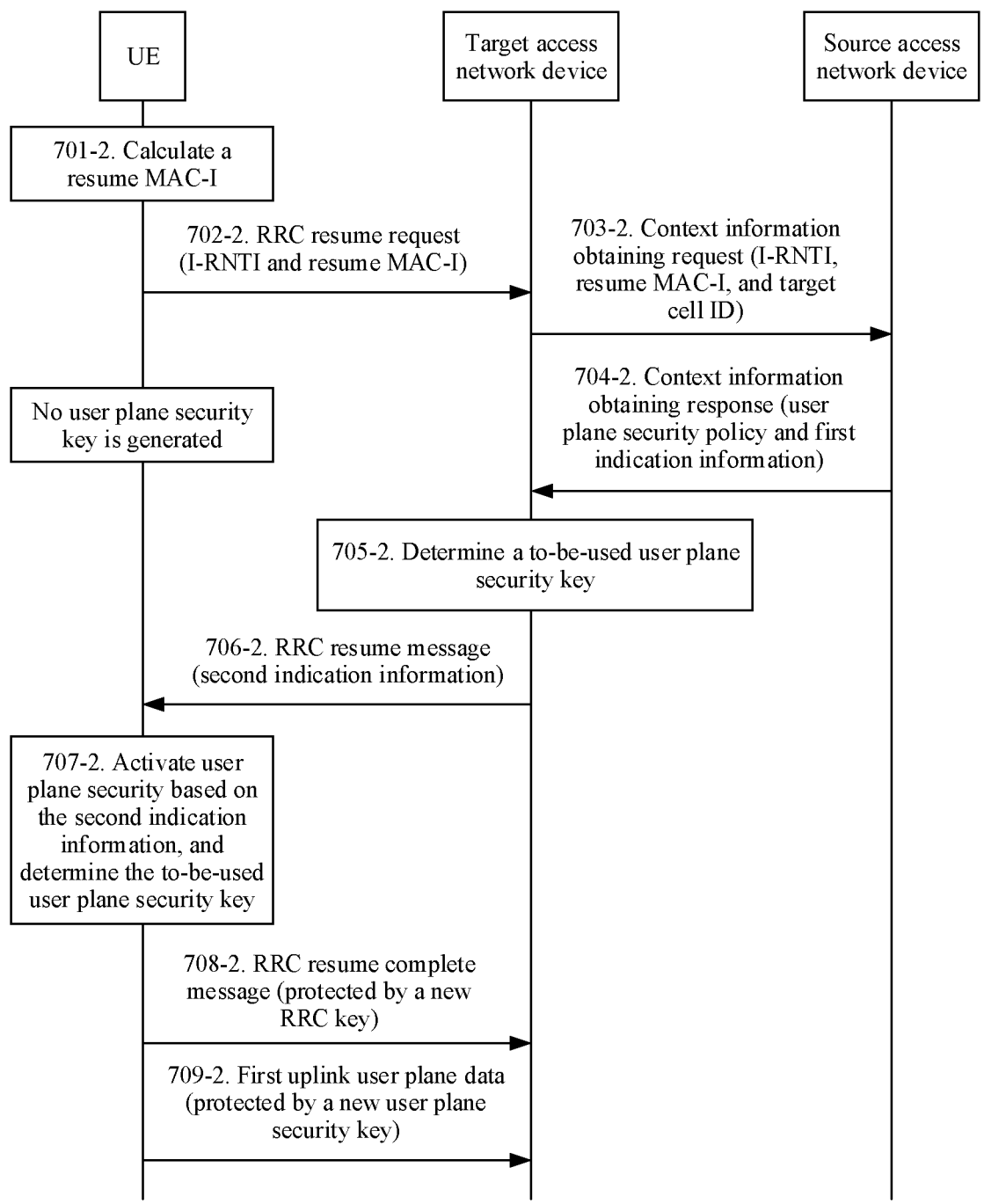
FIG. 7B is a schematic flowchart of a communication method according to Embodiment 5 of this application.

FIG. 7B is a schematic flowchart of a communication method according to Embodiment 5 of this application. This embodiment mainly describes how to perform security protection on user plane data in a resume process. The embodiment shown in FIG. 7B is based on the embodiment shown in FIG. 5A, to be more specific, a source access network device stores first indication information in a suspend process. Alternatively, the embodiment shown in FIG. 7B may be based on the procedure shown in FIG. 2. Even if the source access network device does not store the first indication information, the source access network device may determine the first indication information. For example, the source access network device determines a user plane security protection method based on a protection manner of user plane data before the source access network device enters an inactive state, and further determines the first indication information.

The embodiment shown in FIG. 7B may include but is not limited to the following steps.

Step 701-2. A UE calculates a resume MAC-I using an RRC integrity protection key stored in the suspend process.

Step 702-2. The UE sends an RRC resume request to a target access network device. Correspondingly, the target access network device receives the RRC resume request from the UE.

After sending the RRC resume request, the UE generates a new KgNB*, and generates a new RRC key using the new KgNB*. The new RRC key includes a new RRC encryption key and a new RRC integrity protection key.

For implementation processes of step 701-2 and step 702-2, refer to the descriptions of step 301 and step 302 in the embodiment shown in FIG. 3, or refer to the descriptions of step 701-1 and step 702-1.

Step 703-2. The target access network device sends a context information obtaining request to the source access network device. Correspondingly, the source access network device receives the context information obtaining request from the target access network device.

Step 704-2. The source access network device sends a context information obtaining response to the target access network device. Correspondingly, the target access network device receives the context information obtaining response from the source access network device.

For implementation processes of step 703-2 and step 704-2, refer to the descriptions of step 303 and step 304 in the embodiment shown in FIG. 3. However, in addition to content included in the context information obtaining response in step 304, the context information obtaining response in step 704-2 further includes the first indication information. The first indication information is the indication information included by the source access network device in step 505-1 in the embodiment shown in FIG. 5A.

In a possible implementation, the source access network device may determine whether the first indication information needs to be carried. For example, if a base station changes, the source access network device may not send the first indication information. In this case, refer to the description of step 304.

Step 705-2. If the target access network device supports an encryption algorithm and an integrity protection algorithm that are used by a source cell, the target access network device generates the new RRC key (including the new RRC encryption key and the new RRC integrity protection key) using the KgNB*, and determines a to-be-used user plane security key.

In a possible implementation, the target access network device determines, based on the first indication information, whether a user plane security protection method indicated by the first indication information can be supported. If the user plane security protection method cannot be supported, the target access network device re-determines a user plane security protection method between the target access network device and the UE according to a user plane security policy, and activates user plane security. Alternatively, the target access network device re-determines a user plane security protection method between the target access network device and the UE using a method in which the target access network device sends an RRC message to enable the UE and the target access network device to re-establish an RRC connection, and activates user plane security. The target access network device sends the RRC message to the UE, and the RRC message is used to trigger the UE to re-access or re-establish a PDU session to re-establish the RRC connection. In a process of re-establishing the RRC connection, the target access network device and the UE may negotiate the user plane security protection method in an existing manner in which the UE and the base station negotiate the user plane security protection method. In other words, re-establishment of the RRC connection means that the UE needs to re-access the network and re-establish a PDU session connection. Therefore, the user plane security protection method may be renegotiated. In this way, although access efficiency is reduced, best compatibility with other approaches can be implemented. For details about re-determining the user plane security protection method by the target access network device according to the user plane security policy, refer to the description of step 705-1. The target access network device determines a to-be-used user plane security key based on activated user plane security.

In a possible implementation, the target access network device ignores the first indication information, directly determines the user plane security protection method according to the user plane security policy, and activates user plane security. The target access network device determines a to-be-used user plane security key based on activated user plane security.

In a possible implementation, if the source access network device determines not to carry the first indication information, the target access network device determines the user plane security protection method according to the user plane security policy, and activates user plane security. The target access network device determines a to-be-used user plane security key based on activated user plane security.

In a possible implementation, the target access network device directly generates a new user plane security key based on the first indication information and the KgNB*, and activates user plane security using the new user plane security key and the user plane security protection method that is indicated by the first indication information. FIG. 7B corresponds to FIG. 5A, and the UE does not store the first indication information. Therefore, in this manner, the target access network device notifies the UE by including second indication information in an RRC resume message, such that the UE determines the user plane security protection method and activates user plane security. The target access network device may activate user plane security before sending the RRC resume message to the UE, or may activate user plane security after sending the RRC resume message to the UE, for example, activate the user plane security between step 706-2 and step 708-2 or after step 708-2.

Step 706-2. The target access network device sends the RRC resume message to the UE, where the RRC resume message includes the second indication information. Correspondingly, the UE receives the RRC resume message from the target access network device.

Step 707-2. The UE activates user plane security based on the second indication information, and determines a to-be-used user plane security key.

Step 708-2. The UE sends an RRC resume complete message to the target access network device. Correspondingly, the target access network device receives the RRC resume complete message from the UE.

For implementation processes of step 706-2 to step 708-2, refer to the descriptions of step 706-1 to step 708-1 in FIG. 7A. Details are not described herein again.

In the embodiment shown in FIG. 7B, if the source access network device stores the first indication information in the suspend process, but the UE does not store the first indication information, when the target access network device determines that the user plane security protection method indicated by the first indication information cannot be supported, the target access network device re-determines a user plane security protection method according to the user plane security policy, and activates user plane security; or the target access network device directly activates user plane security according to the user plane security protection method indicated by the first indication information. In this embodiment, it is specified that when receiving the second indication information, the UE activates user plane security, and sends uplink user plane data. After receiving the user plane security policy and the first indication information, the target access network device may activate user plane security, thereby ensuring user plane data transmission security in the resume process.

Figure 7C:
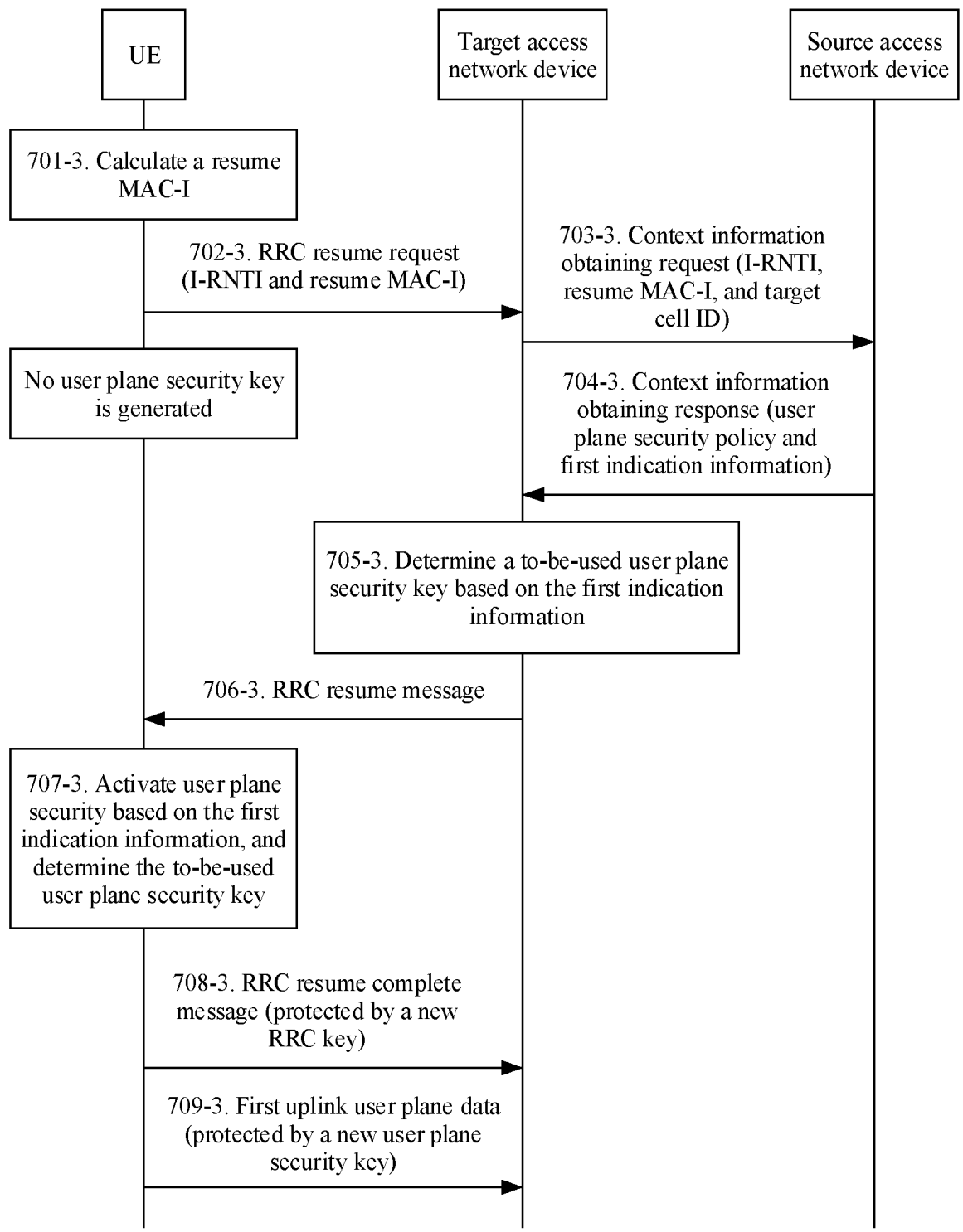
FIG. 7C is a schematic flowchart of a communication method according to Embodiment 6 of this application.

FIG. 7C is a schematic flowchart of a communication method according to Embodiment 6 of this application. This embodiment mainly describes how to perform security protection on user plane data in a resume process. The embodiment shown in FIG. 7C is based on the embodiment shown in FIG. 5B, to be more specific, both a source access network device and a UE store first indication information in a suspend process. Alternatively, the embodiment shown in FIG. 7C may be based on the procedure shown in FIG. 2. Even if the source access network device does not store the first indication information, the source access network device may determine the first indication information. The embodiment shown in FIG. 7C may include but is not limited to the following steps.

Step 701-3. The UE calculates a resume MAC-I using an RRC integrity protection key stored in the suspend process.

Step 702-3. The UE sends an RRC resume request to a target access network device. Correspondingly, the target access network device receives the RRC resume request from the UE.

After sending the RRC resume request, the UE generates a new KgNB*, and generates an RRC key using the new KgNB*. The RRC key includes an RRC encryption key and an RRC integrity protection key.

For implementation processes of step 701-3 and step 702-3, refer to the descriptions of step 301 and step 302 in the embodiment shown in FIG. 3, or refer to the descriptions of step 701-1 and step 702-1.

Step 703-3. The target access network device sends a context information obtaining request to the source access network device. Correspondingly, the source access network device receives the context information obtaining request from the target access network device.

Step 704-3. The source access network device sends a context information obtaining response to the target access network device. Correspondingly, the target access network device receives the context information obtaining response from the source access network device. The context information obtaining response includes a user plane security policy and the first indication information. For details, refer to the description of step 704-2.

Step 705-3. If the target access network device supports an encryption algorithm and an integrity protection algorithm that are used by a source cell, the target access network device generates the new RRC key (including the new RRC encryption key and the new RRC integrity protection key) using the KgNB*, and determines a to-be-used user plane security key based on the first indication information. For a process, refer to the description of determining the to-be-used user plane security key based on the first indication information in step 705-2.

The target access network device may activate user plane security before sending an RRC resume message to the UE, or may activate user plane security after sending an RRC resume message to the UE, for example, activate the user plane security between step 706-3 and step 708-3 or after step 708-3.

Step 706-3. The target access network device sends the RRC resume message to the UE. Correspondingly, the UE receives the RRC resume message from the target access network device.

Step 707-3. The UE activates user plane security based on the first indication information, and determines a to-be-used user plane security key.

After receiving the RRC resume message, the UE verifies signaling plane security of the RRC resume message, generates all user plane security keys after the verification succeeds, and then further determines the to-be-used user plane security key based on a user plane security activation status or the first indication information. The user plane security activation status refers to how to activate user plane security before the UE enters a third state from a connected state. For example, if the UE generates the user plane encryption key and the user plane integrity protection key, and the user plane security activation status or the first indication information indicates that user plane encryption protection is enabled and user plane integrity protection is disabled, the UE uses only the user plane encryption key. The user plane integrity protection key may be deleted or retained. This is not limited in this embodiment of this application. Alternatively, the UE may directly determine the to-be-used user plane security key based on the user plane security activation status or the first indication information. For example, if the user plane security activation status or the first indication information indicates that user plane encryption protection is enabled and user plane integrity protection is disabled, the target access network device only needs to generate the user plane encryption key, and does not need to generate the user plane integrity protection key. The step of generating, by the UE, a new user plane security key based on the first indication information and activating user plane security may be performed after the RRC resume message is received, in other words, step 707-3 is performed after step 706-3. Alternatively, the step of generating, by the UE, a new user plane security key based on the first indication information and activating user plane security may be performed after the UE sends the RRC resume request to the target access network device, in other words, step 707-3 is performed after step 702-3. If step 707-3 is performed after step 706-3 and second indication information is carried in step 706-3, the UE needs to release an RRC connection. This is because if the second indication information is carried in step 706-3, it means that the UE needs to re-determine the user plane security protection method based on the second indication information. Due to re-determining of the user plane security protection method, the UE may be unable to continue using the previous user plane security protection method. Therefore, the UE needs to release the RRC connection. Optionally, the UE may report an error to the target access network device, such that the target access network device actively initiates RRC connection release or an RRC connection re-establishment procedure.

Step 708-3. The UE sends an RRC resume complete message to the target access network device. Correspondingly, the target access network device receives the RRC resume complete message from the UE.

A difference between FIG. 7C and FIG. 7B lies in that, in step 705-3, the target access network device directly generates a new user plane security key based on the first indication information, and activates user plane security. Because the UE stores the first indication information, the target access network device does not need to include the second indication information in the RRC resume message. In this way, a user plane security protection method used before the UE and the source access network device enter an inactive state from a connected state is consistent with a user plane security protection method used after the UE and the source access network device enter the inactive state from the connected state, such that the UE and the source access network device can quickly perform security protection or security deprotection on user plane data.

If the target access network device determines a new user plane security protection method according to a user plane security policy, the RRC resume message needs to carry the second indication information to indicate the user plane security protection method determined by the target access network device. The UE determines the user plane security protection method based on the second indication information, and activates corresponding user plane security.

In the embodiment shown in FIG. 7C, both the UE and the source access network device store the first indication information in the suspend process, and both can generate a new user plane security key based on the first indication information. The UE may generate a new user plane security key before or after receiving the RRC resume message, and activate user plane security. The target access network device may generate a new user plane security key after sending the RRC resume message, and activate user plane security. In this way, user plane data transmission security in the resume process is ensured.

In FIG. 7A, FIG. 7B, and FIG. 7C, after sending the RRC resume request, the UE does not immediately generate a user plane security key. In the following FIG. 8A and FIG. 8B, after sending the RRC resume request, the UE immediately generates a user plane security key.

Figure 8A:
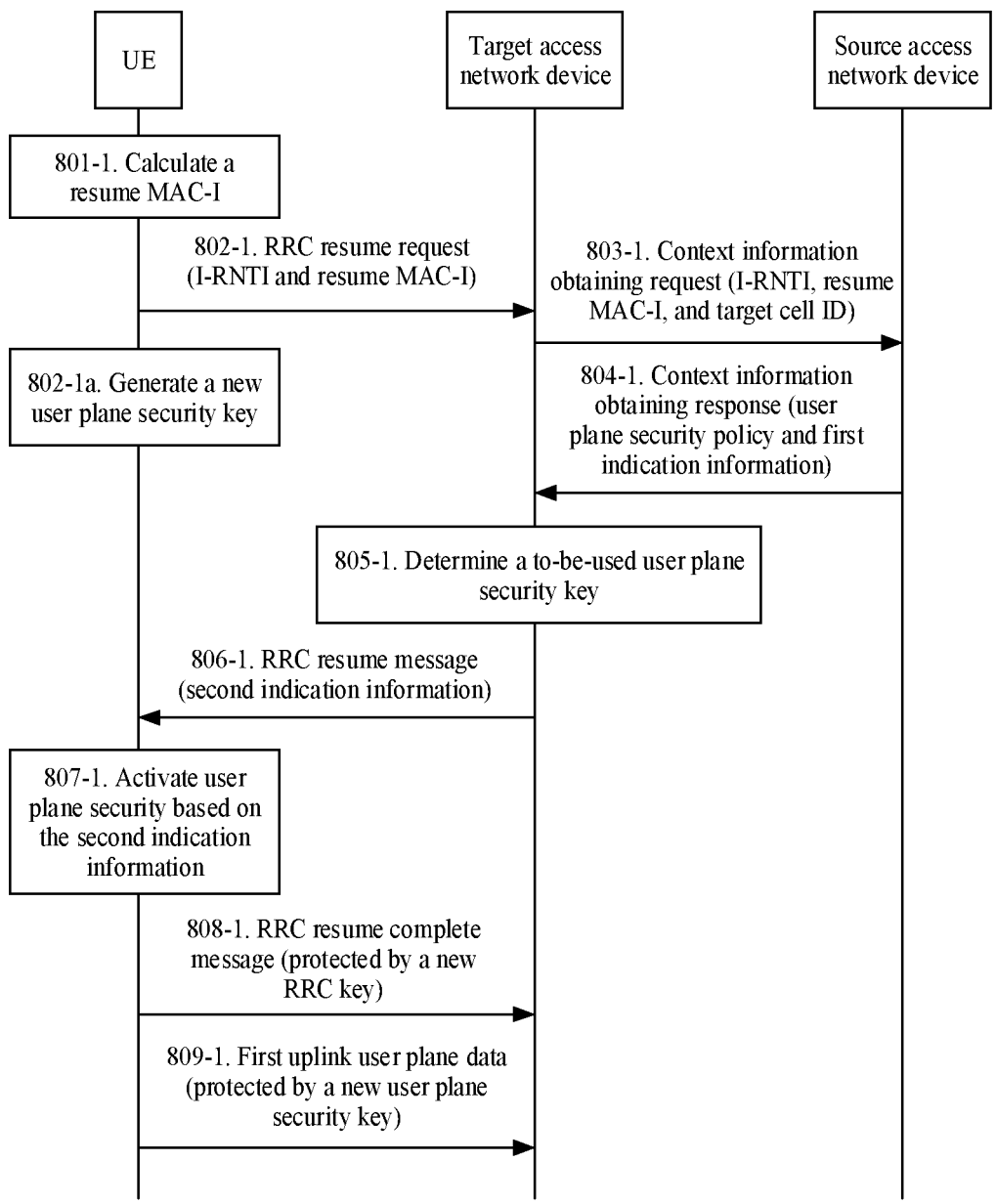
FIG. 8A is a schematic flowchart of a communication method according to Embodiment 7 of this application.

FIG. 8A is a schematic flowchart of a communication method according to Embodiment 7 of this application. This embodiment mainly describes how to perform security protection on user plane data in a resume process. The embodiment shown in FIG. 8A is based on the embodiment shown in FIG. 5A, or may be based on the procedure shown in FIG. 2. FIG. 7B is also based on FIG. 5A. However, the user plane security key is not generated in step 702-2 in FIG. 7B, but a new user plane security key is generated in step 802-1 in FIG. 8A. The embodiment shown in FIG. 8A may include but is not limited to the following steps.

Step 801-1. A UE calculates a resume MAC-I using an RRC integrity protection key stored in a suspend process.

Step 802-1. The UE sends an RRC resume request to a target access network device. Correspondingly, the target access network device receives the RRC resume request from the UE.

After sending the RRC resume request, the UE generates a new KgNB*, and generates a new RRC key using the new KgNB*. The new RRC key includes a new RRC encryption key and a new RRC integrity protection key. After sending the RRC resume request, the UE further generates a new user plane security key. The step of generating the new user plane security key by the UE is used as step 802-1a.

In step 802-1a, the new user plane security key generated by the UE is a user plane encryption key or a user plane integrity protection key, or a user plane encryption key and a user plane integrity protection key. It may be understood that the new user plane security key is a determined user plane security key.

In a possible implementation, the UE directly generates a new user plane security key based on the new KgNB*, to be more specific, a new user plane encryption key and a new user plane integrity protection key. This manner is optional in step 302 in FIG. 3.

In a possible implementation, when both the UE and the source access network device store the first indication information in the embodiment shown in FIG. 5B, the UE generates a new user plane security key based on the new KgNB* and the stored first indication information. In this case, a new user plane encryption key and/or a new user plane integrity protection key are/is generated. For example, if the first indication information indicates that user plane encryption protection is not enabled and user plane integrity protection is enabled, the UE generates a new user plane integrity protection key based on the new KgNB*, and does not need to generate a new user plane encryption key.

If the UE stores a user plane security key in the suspend process, for example, the UE determines to store the user plane security key in the embodiment shown in FIG. 6, when the UE generates a new user plane security key and no early data transfer occurs, the user plane security key stored in the suspend process is deleted. In this embodiment of this application, the user plane security key stored in the suspend process is referred to as an old user plane security key, and the user plane security key newly generated in the resume process is referred to as a new user plane security key. In this case, when the new user plane security key is generated and no early data transfer occurs, the old user plane security key is deleted. When there is early data transfer, the old user plane security key is deleted at an appropriate time. For example, the UE deletes the old user plane security key after receiving the RRC resume message. For another example, the UE deletes the old user plane security key after determining that early data is successfully sent. In the embodiment shown in FIG. 8A, regardless of whether the UE stores the old user plane security key in the suspend process, the UE uses the new user plane security key after receiving the RRC resume message. Alternatively, if the UE does not store the old user plane security key in the suspend process, the UE uses the new user plane security key to protect and verify uplink and downlink user plane data after receiving the RRC resume message.

When generating the new user plane security key, the UE may immediately activate user plane security, or may not immediately activate user plane security. In other words, user plane security activation may be performed in step 802-1a or after step 802-1a. An advantage of immediate activation lies in that user plane security helps the UE immediately send uplink user plane data, and the uplink user plane data can be security protected by the new user plane security key. An advantage of non-immediate activation lies in that the UE may send the uplink user plane data after determining that the UE successfully accesses the target access network device or the source access network device in the resume process. If the UE sends the uplink user plane data before determining an access success, the sent uplink user plane data may need to be sent again due to a resume process failure. In addition, if user plane security is not activated immediately, the UE cannot immediately send the uplink user plane data, or the sent uplink user plane data is not security protected. In the embodiment shown in FIG. 8A, an example in which user plane security is activated after step 806-1 is used.

Whether user plane security is activated in step 802-1*a* may be determined by the UE based on whether the UE needs to immediately send the uplink user plane data. For example, if the UE needs to immediately send the uplink user plane data, user plane security may be immediately activated after the new user plane security key is generated. In step 802-1*a*, whether to activate user plane security may be determined by the UE based on a procedure pre-agreed on by the UE and an access network device. For example, as specified in the standard, after the access network device sends the RRC resume message (that is, after step 806-1), the UE and the access network device activate user plane security. In this case, after generating the new user plane security key, the UE does not immediately activate user plane security, in other words, user plane security is not activated in step 802-1*a*. In other words, in this example, user plane security activation and user plane security key generation are decoupled. For another example, as specified in the standard, the UE may activate user plane security after or before the UE sends the RRC resume request. In this case, the UE may first activate user plane security, and then generate the new user plane security key based on the activated user plane security. Alternatively, the UE first generates all user plane security keys, and then determines a to-be-used user plane security key based on to-be-activated user plane security, that is, determines a new user plane security key (in this case, the user plane encryption key and the user plane integrity protection key are generated in step 802-1*a*, then the UE determines a key to be used in step 807-1, and this is described in the embodiment shown in FIG. 8B).

When the UE stores the old user plane security key and there is early data transfer, the UE and the access network device may activate user plane security twice. To be more specific, before sending early data, the UE first activates user plane security. In this case, a user plane security protection method may be a user plane security protection method (an on-demand user plane security protection method) used before the UE enters an inactive state, or may be a fixed user plane security protection method (for example, the fixed user plane security protection method is to enable only integrity protection) specified in the standard. The access network device performs same processing as the UE. To be more specific, when receiving early data, the access network device first activates user plane security. In this case, the user plane security protection method may be a user plane security protection method (an on-demand user plane security protection method) used before the UE enters the inactive state, or may be a fixed user plane security protection method (for example, the fixed user plane security protection method is to enable only integrity protection) specified in the standard. After the early data is sent, the UE and the access network device may reactivate user plane security. In this case, the activated user plane security is used after the UE and the access network device enter a connected state. The user plane security protection method may be the same as or different from that in the first time. Certainly, a feasible optimization method is that if the access network device determines that the user plane security protection method activated for the first time may continue to be used, the access network device and the UE continue to use the previous user plane security protection method. In this case, an explicit notification may be provided in step 806-1, for example, may be provided by transferring the second indication information. Alternatively, an implicit notification may be provided, to be more specific, no indication information is transmitted, and the UE and the access network device continue to use the activated user plane security protection method by default. In this case, the UE and the access network device may continue to use the stored old user plane security key, or may use a newly generated user plane security key. An advantage of using the old user plane security key is that no additional user plane security key needs to be generated by occupying a resource. An advantage of using the new user plane security key is that compatibility with an existing user plane security protection method is good.

That the UE activates user plane security means that the UE activates a user plane security protection method between the UE and the target access network device, and the user plane security protection method may be enabled to perform security protection on the uplink user plane data. If the target access network device does not exist, the UE activates a user plane security protection method between the UE and the source access network device.

Step 803-1. The target access network device sends a context information obtaining request to the source access network device. Correspondingly, the source access network device receives the context information obtaining request from the target access network device.

Step 804-1. The source access network device sends a context information obtaining response to the target access network device. Correspondingly, the target access network device receives the context information obtaining response from the source access network device.

For implementation processes of step 803-1 and step 804-1, refer to the descriptions of step 303 and step 304 in the embodiment shown in FIG. 3. However, in addition to content included in the context information obtaining response in step 304, the context information obtaining response in step 804-1 further optionally includes the first indication information. The first indication information is the indication information stored in the source access network device in step 505-1 in the embodiment shown in FIG. 5A. In another possible implementation, when the first indication information is generated, the source access network device may further determine whether to send the first indication information. If the source access network device sends a security context used in the resume process to the target access network device, the source access network device does not send the first indication information.

Step 805-1. If the target access network device supports an encryption algorithm and an integrity protection algorithm that are used by a source cell, the target access network device generates the new RRC key (including the new RRC encryption key and the new RRC integrity protection key) using the KgNB*, and determines a to-be-used user plane security key.

In a possible implementation, if the context information obtaining response includes only the user plane security policy, the target access network device activates user plane security according to the user plane security policy, and determines the to-be-used user plane security key based on the activated user plane security. For details, refer to the description of step 705-1 in FIG. 7A. As a supplement to the possible implementation of step 705-1, the description of step 807-2 in FIG. 8B may also be used for reference.

In a possible implementation, if the context information obtaining response includes the user plane security policy and the first indication information, the target access network device may activate user plane security based on the user plane security policy when determining that the user plane security protection method indicated by the first indication information cannot be supported. Correspondingly, a to-be-used user plane security key is determined based on the activated user plane security. When determining that the user plane security protection method indicated by the first indication information can be supported, the target access network device may activate user plane security based on the first indication information. Correspondingly, the target access network device determines the to-be-used user plane security key based on the activated user plane security. For details, refer to the description of step 705-1 in FIG. 7A or the description of step 807-2 in FIG. 8B. Alternatively, the target access network device directly determines the to-be-used user plane security key based on the first indication information. For details, refer to the description of step 705-2 in FIG. 7B.

Particularly, if there is no target access network device, in other words, the UE sends the RRC resume request to the source access network device, generation of a user plane security key by the source access network device may be asynchronous with user plane security activation, to be more specific, the source access network device may first generate all user plane security keys, and then determine a to-be-used user plane security key based on to-be-activated user plane security. Alternatively, the source access network device may determine to continue to use the stored old user plane security key. If the old user plane security key continues to be used, the source access network device may include indication information in the RRC resume message, and the indication information is used to indicate that the old user plane security key continues to be used. In this case, the UE does not perform step 802-1*a*, to be more specific, does not generate a new user plane security key; or performs step 802-1*a*, but deletes the new user plane security key in step 807-1.

In another possible implementation, if there is no target access network device, the source access network device activates user plane security based on the first indication information; and then sends the second indication information to the UE. The UE activates user plane security based on the second indication information, and determines a to-be-used user plane security key.

However, when there is a target access network device, the UE and the target access network device can use only a new user plane security key. Therefore, after receiving the RRC resume message, the UE needs to determine whether there is a target access network device. If there is a target access network device, the UE needs to delete the stored old user plane security key and start to use the new user plane security key. Because the target access network device does not have the old user plane security key, the target access network device can use only the new user plane security key. In this case, the source access network device deletes the old user plane security key. For example, the source access network device may delete the old user plane security key after step 804-1.

Step 806-1. The target access network device sends the RRC resume message to the UE, where the RRC resume message includes the second indication information. Correspondingly, the UE receives the RRC resume message from the target access network device.

Step 807-1. The UE activates user plane security based on the second indication information.

A difference from step 707-1 and step 707-2 lies in that user plane security is directly activated based on the second indication information in step 807-1, that is, security protection may be performed on the uplink user plane data using the new user plane security key and the user plane security protection method that is indicated by the second indication information, and security deprotection may be performed on downlink user-plane data using the new user plane security key and the user plane security protection method that is indicated by the second indication information. After user plane security is activated, because the new user plane security key has been generated in step 802-1*a*, in step 807-1, the new user plane security key may be directly used based on a user plane security activation status. In step 707-1 and step 707-2, the UE determines the user plane security protection method between the UE and the target access network device based on the second indication information, and activates user plane security. In other words, in step 707-1 and step 707-2, the new user plane security key is related to the second indication information, but in step 807-1, the new user plane security key is unrelated to the second indication information.

If the UE stores the old user plane security key, the UE deletes the old user plane security key after activating user plane security using the new user plane security key.

Step 808-1. The UE sends an RRC resume complete message to the target access network device. Correspondingly, the target access network device receives the RRC resume complete message from the UE.

Step 809-1. The UE sends first uplink user plane data to the target access network device. Correspondingly, the target access network device receives the first uplink user plane data from the UE.

For implementation processes of step 808-1 and step 809-1, refer to the descriptions of step 708-1 and step 709-1.

In the embodiment shown in FIG. 8A, when the source access network device stores the first indication information in the suspend process, but the UE does not store the first indication information, the target access network device notifies the UE of the user plane security protection method after determining the user plane security protection method. In this embodiment, it is specified that when receiving the second indication information, the UE activates user plane security, and sends uplink user plane data. After receiving the user plane security policy and the first indication information, the target access network device may activate user plane security, thereby ensuring user plane data transmission security in the resume process.

If the UE stores the first indication information in the suspend process (as shown in the embodiment shown in FIG. 5B), in step 802-1*a*, the UE generates the new user plane security key based on the first indication information; in step 805-1, the target access network device generates the new user plane security key based on the first indication information and activates user plane security; in step 806-1, the RRC resume message does not carry the second indication information; in step 808-1, the UE activates user plane security based on the first indication information; and in step 809-1, the UE performs security protection on the uplink user plane data using the new user plane security key and the user plane security protection method that is indicated by the first indication information, to obtain the first uplink user plane data.

Figure 8B:
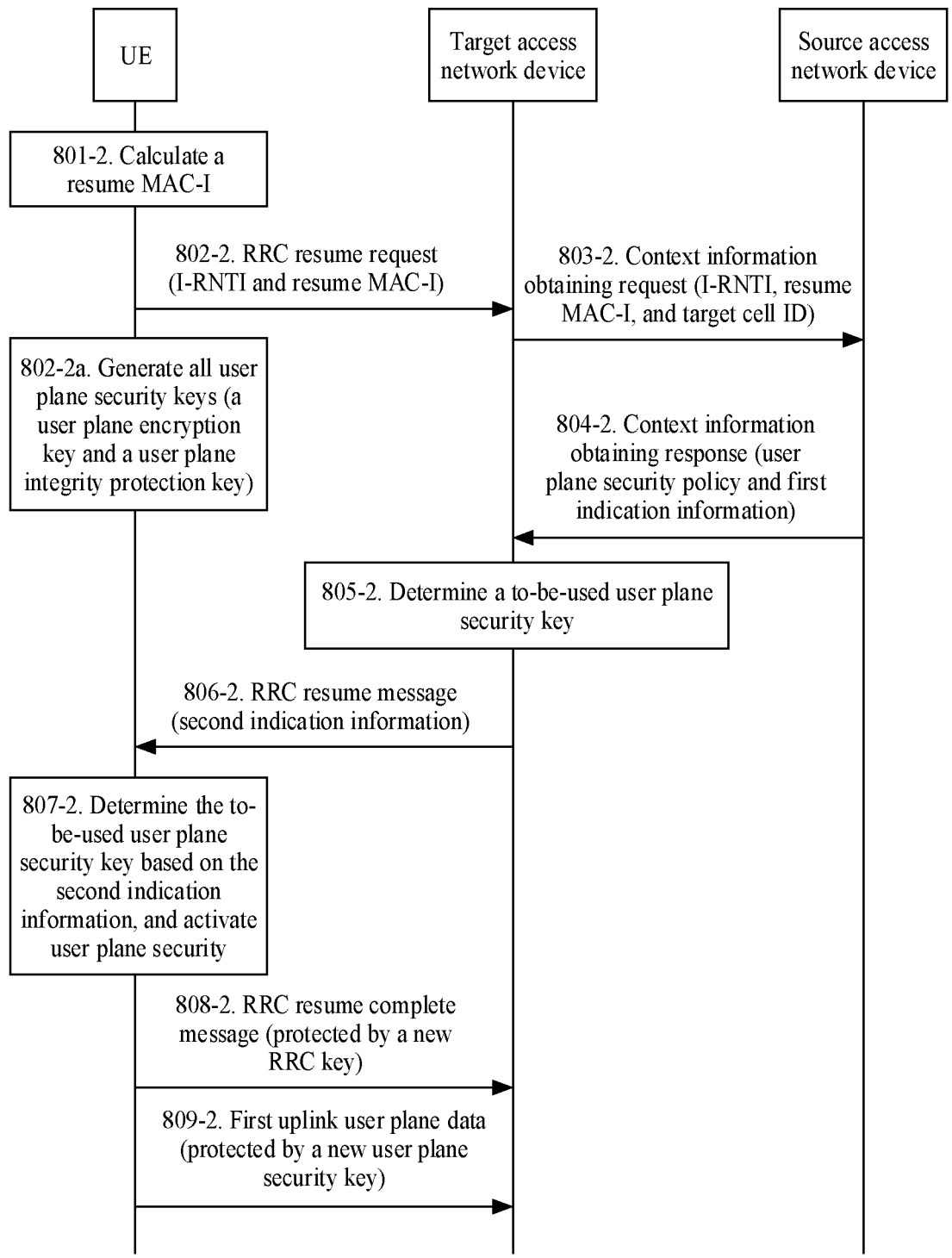
FIG. 8B is a schematic flowchart of a communication method according to Embodiment 8 of this application.

FIG. 8B is a schematic flowchart of a communication method according to Embodiment 8 of this application. This embodiment mainly describes how to perform security protection on user plane data in a resume process. The embodiment shown in FIG. 8B is based on the embodiment shown in FIG. 5A, or may be based on the procedure shown in FIG. 2. FIG. 8B is also based on FIG. 5A. However, all user plane security keys are generated in step 802-2a in FIG. 8B, and a new user plane security key, namely, a determined user plane security key, is generated in step 802-1a in FIG. 8A. For a same part of the embodiment shown in FIG. 8B and the embodiment shown in FIG. 8A, refer to the description of FIG. 8A. The embodiment shown in FIG. 8B may include but is not limited to the following steps.

Step 801-2. A UE calculates a resume MAC-I using an RRC integrity protection key stored in a suspend process.

Step 802-2. The UE sends an RRC resume request to a target access network device. Correspondingly, the target access network device receives the RRC resume request from the UE.

Step 802-2a. The UE generates all user plane security keys, where all the user plane security keys include a user plane encryption key and a user plane integrity protection key, such that the UE determines a to-be-used user plane security key based on to-be-activated user plane security, that is, determines a new user plane security key. After receiving an RRC resume message, the UE may determine the to-be-used user plane security key based on second indication information. Alternatively, the UE may determine the to-be-used user plane security key based on first indication information when the UE stores the first indication information. In the embodiment shown in FIG. 8B, after receiving the RRC resume message, the UE determines the to-be-used user plane security key based on the second indication information.

Step 803-2. The target access network device sends a context information obtaining request to a source access network device. Correspondingly, the source access network device receives the context information obtaining request from the target access network device.

Step 804-2. The source access network device sends a context information obtaining response to the target access network device. Correspondingly, the target access network device receives the context information obtaining response from the source access network device.

Step 805-2. If the target access network device supports an encryption algorithm and an integrity protection algorithm that are used by a source cell, the target access network device generates a new RRC key (including a new RRC encryption key and a new RRC integrity protection key) using KgNB*, and determines a to-be-used user plane security key. For an implementation process of step 805-2, refer to the description of step 805-1.

Step 806-2. The target access network device sends the RRC resume message to the UE, where the RRC resume message includes the second indication information. Correspondingly, the UE receives the RRC resume message from the target access network device.

Step 807-2. The UE determines the to-be-used user plane security key based on the second indication information, and activates user plane security.

The UE determines, based on the second indication information, the to-be-used user plane security key in all the user plane security keys generated in step 802-2a. For example, if the second indication information indicates that user plane encryption protection is enabled and user plane integrity protection is not enabled, and the user plane encryption key and the user plane integrity protection key are generated in step 802-2a, the determined to-be-used user plane security key is the user plane encryption key. A user plane security key that is not used may be deleted or retained.

After determining the new user plane security key, the UE may perform security protection on uplink user plane data and security deprotection on downlink user plane data using the new user plane security key and a user plane security protection method that is indicated by the second indication information.

Step 808-2. The UE sends an RRC resume complete message to the target access network device. Correspondingly, the target access network device receives the RRC resume complete message from the UE.

Step 809-2. The UE sends first uplink user plane data to the target access network device. Correspondingly, the target access network device receives the first uplink user plane data from the UE.

In the embodiment shown in FIG. 8A, when the source access network device stores the first indication information in the suspend process, but the UE does not store the first indication information, the UE first generates all the user plane security keys, determines the to-be-used user plane security key after receiving the RRC resume message, and activates user plane security; and the target access network device notifies the UE of the user plane security protection method after determining the user plane security protection method. In this embodiment, it is specified that when receiving the second indication information, the UE activates user plane security, and sends uplink user plane data. After receiving a user plane security policy and the first indication information, the target access network device may activate user plane security, thereby ensuring user plane data transmission security in the resume process.

If the UE stores the first indication information in the suspend process (as shown in the embodiment shown in FIG. 5B), in step 805-2, the target access network device determines the to-be-used user plane security key based on the first indication information; in step 806-2, the RRC resume message does not carry the second indication information; in step 807-2, the UE determines the to-be-used user plane security key based on the first indication information and activates user plane security; and in step 809-2, the UE performs security protection on the uplink user plane data using the new user plane security key and the user plane security protection method that is indicated by the first indication information, to obtain the first uplink user plane data.

Figure 9A:
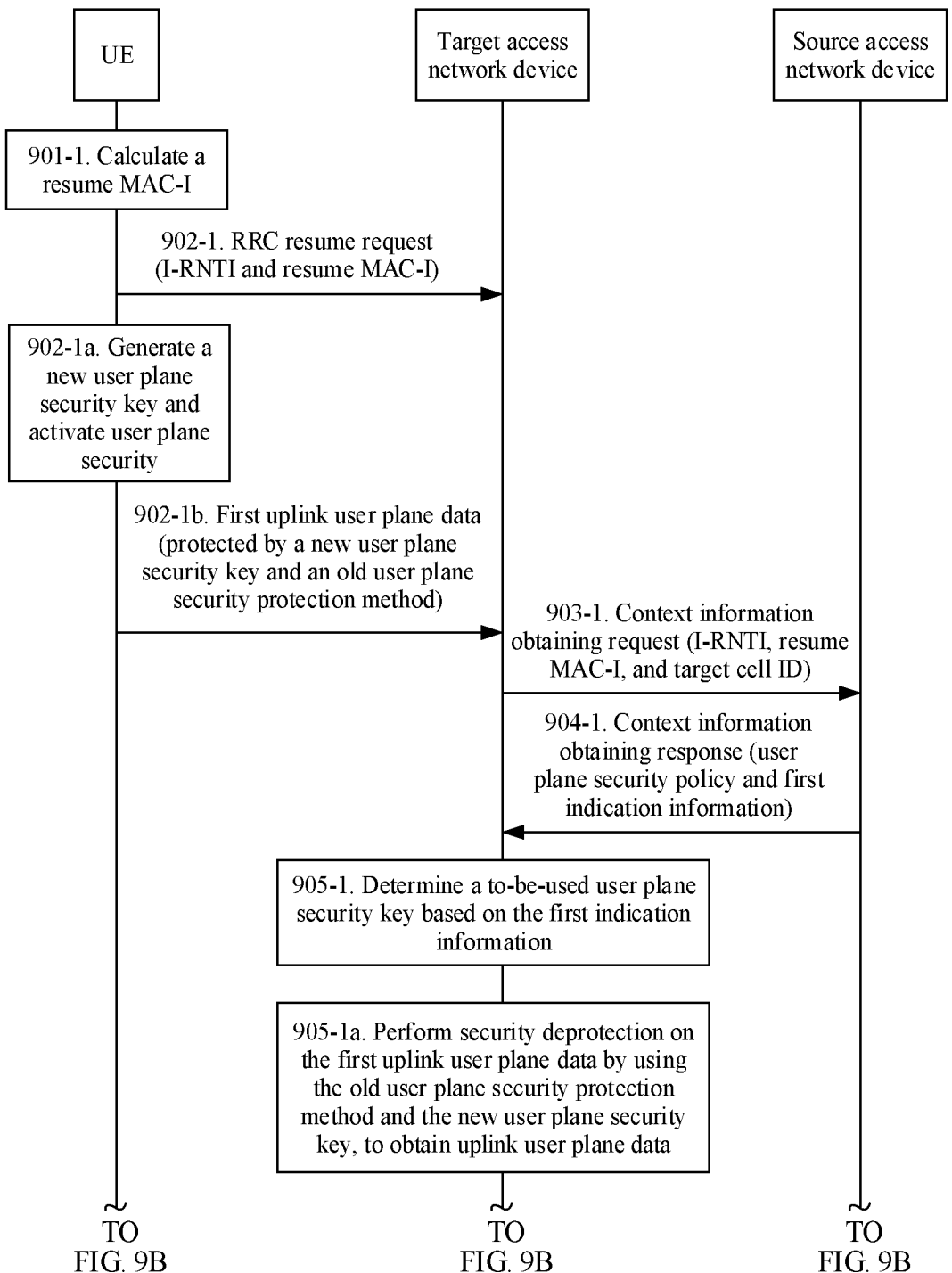
FIG. 9A and FIG. 9B are a schematic flowchart of a communication method according to Embodiment 9 of this application.
Figure 9B:
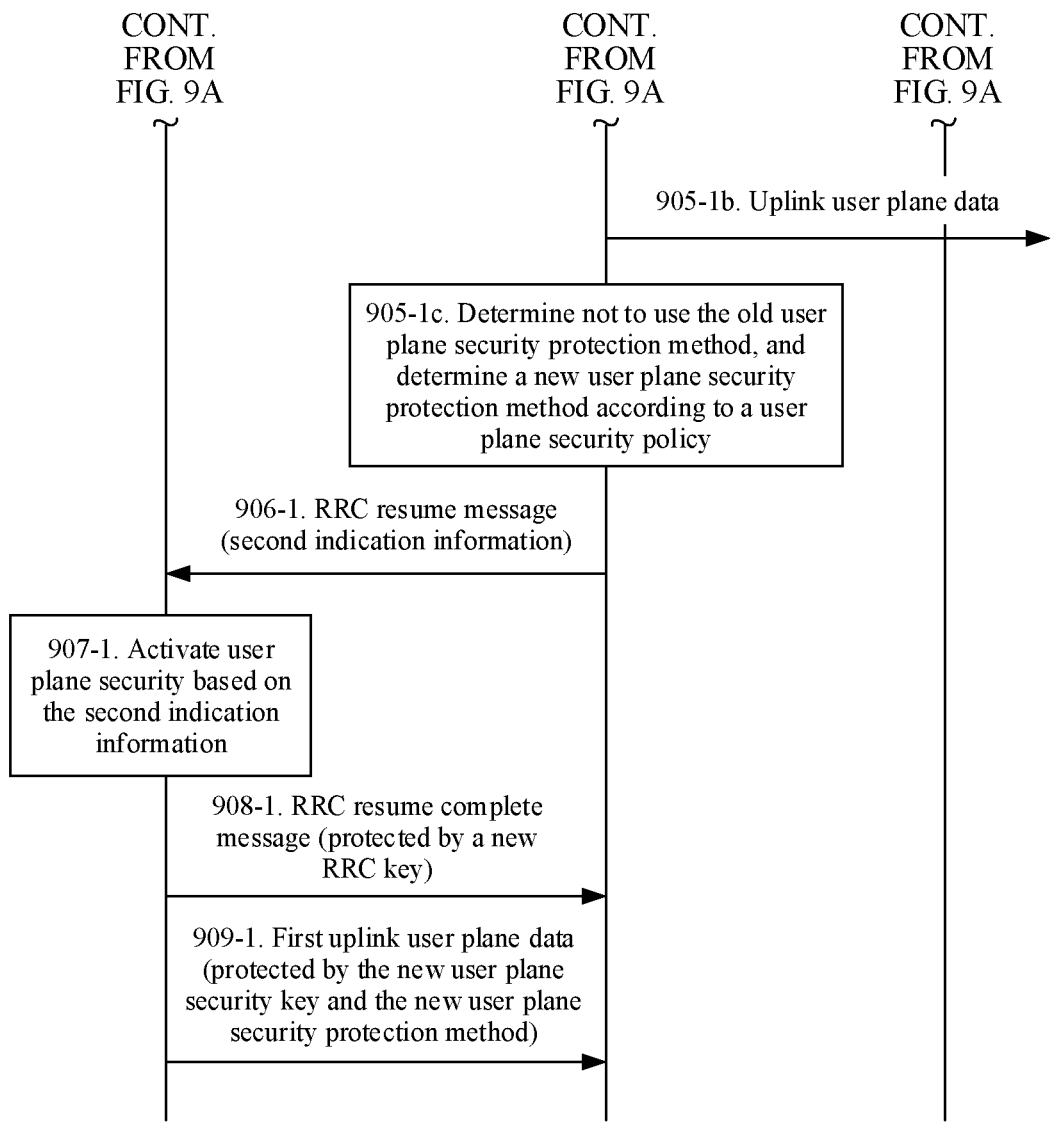

FIG. 9A and FIG. 9B are a schematic flowchart of a communication method according to Embodiment 9 of this application. This embodiment mainly describes how to perform security protection on user plane data in a resume process. The embodiment shown in FIG. 9A and FIG. 9B is based on the embodiment shown in FIG. 5A, or may be based on the procedure shown in FIG. 2. For a same part of the embodiment shown in FIG. 9A and FIG. 9B and the embodiment shown in FIG. 8A, refer to the description of FIG. 8A. The embodiment shown in FIG. 9A and FIG. 9B may include but is not limited to the following steps.

Step 901-1. A UE calculates a resume MAC-I using an RRC integrity protection key stored in a suspend process.

Step 902-1. The UE sends an RRC resume request to a target access network device. Correspondingly, the target access network device receives the RRC resume request from the UE.

Step 902-1a. The UE generates a new user plane security key and activates user plane security.

Step 902-1*b*. The UE sends first uplink user plane data to the target access network device. Correspondingly, the target access network device receives the first uplink user plane data from the UE.

The UE performs security protection on uplink user plane data using the new user plane security key and a user plane security protection method that is indicated by first indication information, to obtain the first uplink user plane data. In other words, the UE performs security protection on the uplink user plane data using the old user plane security protection method and the new user plane security key, to obtain the first uplink user plane data.

Step 903-1. The target access network device sends a context information obtaining request to a source access network device. Correspondingly, the source access network device receives the context information obtaining request from the target access network device.

Step 904-1. The source access network device sends a context information obtaining response to the target access network device. Correspondingly, the target access network device receives the context information obtaining response from the source access network device.

Step 905-1. If the target access network device supports an encryption algorithm and an integrity protection algorithm that are used by a source cell, the target access network device generates a new RRC key (including a new RRC encryption key and a new RRC integrity protection key) using KgNB*, and determines a to-be-used user plane security key based on the first indication information.

The target access network device activates user plane security based on the first indication information, and determines the to-be-used user plane security key based on the activated user plane security. For an implementation process of step 905-1, refer to the description of step 705-3.

Step 905-1*a*. The target access network device performs security deprotection on the first uplink user plane data to obtain the uplink user plane data.

The target access network device performs security deprotection on the first uplink user plane data using the old user plane security protection method and the new user plane security key, to obtain the uplink user plane data.

Step 905-1*b*. The target access network device sends the uplink user plane data to a core network, and for example, sends the uplink user plane data to a user plane function (UPF).

Step 905-1*c*. The target access network device determines not to use the old user plane security protection method, and determines a new user plane security protection method according to a user plane security policy.

For details about determining the new user plane security protection method by the target access network device according to the user plane security policy, refer to the description of step 705-1 in FIG. 7A.

Step 906-1. The target access network device sends an RRC resume message to the UE, where the RRC resume message includes second indication information. Correspondingly, the UE receives the RRC resume message from the target access network device.

The second indication information is used to indicate the new user plane security protection method determined by the target access network device.

Step 907-1. The UE reactivates user plane security based on the second indication information.

The UE reactivates user plane security using the new user plane security protection method and the new user plane security key. In other words, the UE may perform security protection on the uplink user plane data using the new user plane security protection method and the new user plane security key.

Step 908-1. The UE sends an RRC resume complete message to the target access network device. Correspondingly, the target access network device receives the RRC resume complete message from the UE.

Step 909-1. The UE sends second uplink user plane data to the target access network device. Correspondingly, the target access network device receives the second uplink user plane data from the UE.

The UE performs security protection on the uplink user plane data using the new user plane security key and the new user plane security protection method that is indicated by the second indication information. In other words, the UE performs security protection on the uplink user plane data using the new user plane security protection method and the new user plane security key, to obtain the second uplink user plane data.

In the embodiment shown in FIG. 9A and FIG. 9B, user plane security activation is performed twice. The first user plane security activation is performed after the UE sends the RRC resume request, and in this case, the new user plane security key and the old user plane security protection method are used. The second user plane security activation is performed after the UE receives the second indication information, and in this case, the new user plane security key and the new user plane security protection method are used. If it is determined to continue to use the old user plane security protection method in step 905-1*c*, the RRC resume message in step 706 does not carry the second indication information, and step 907-1 and step 909-1 are not performed.

Figure 10A:
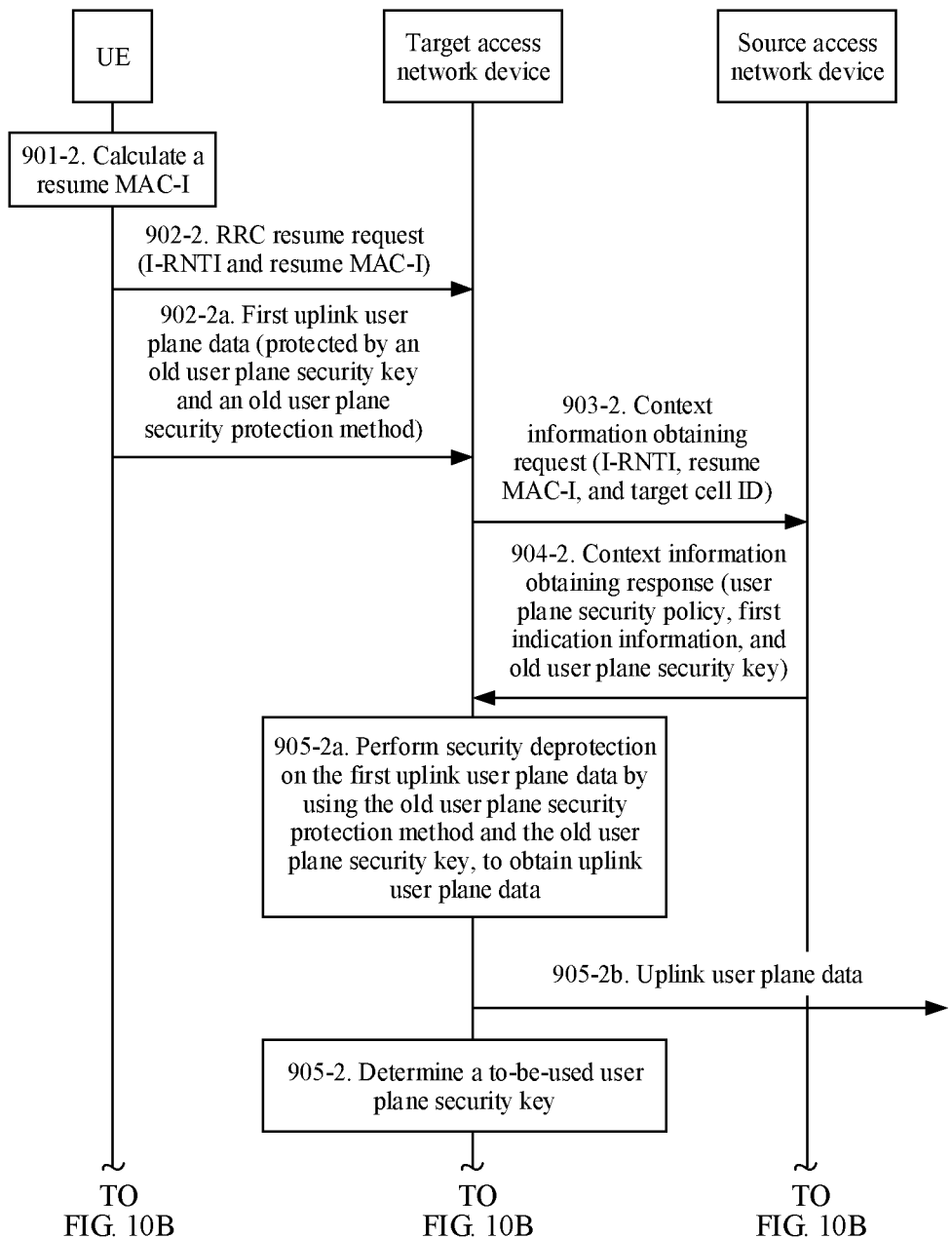
FIG. 10A and FIG. 10B are a schematic flowchart of a communication method according to Embodiment 10 of this application.
Figure 10B:
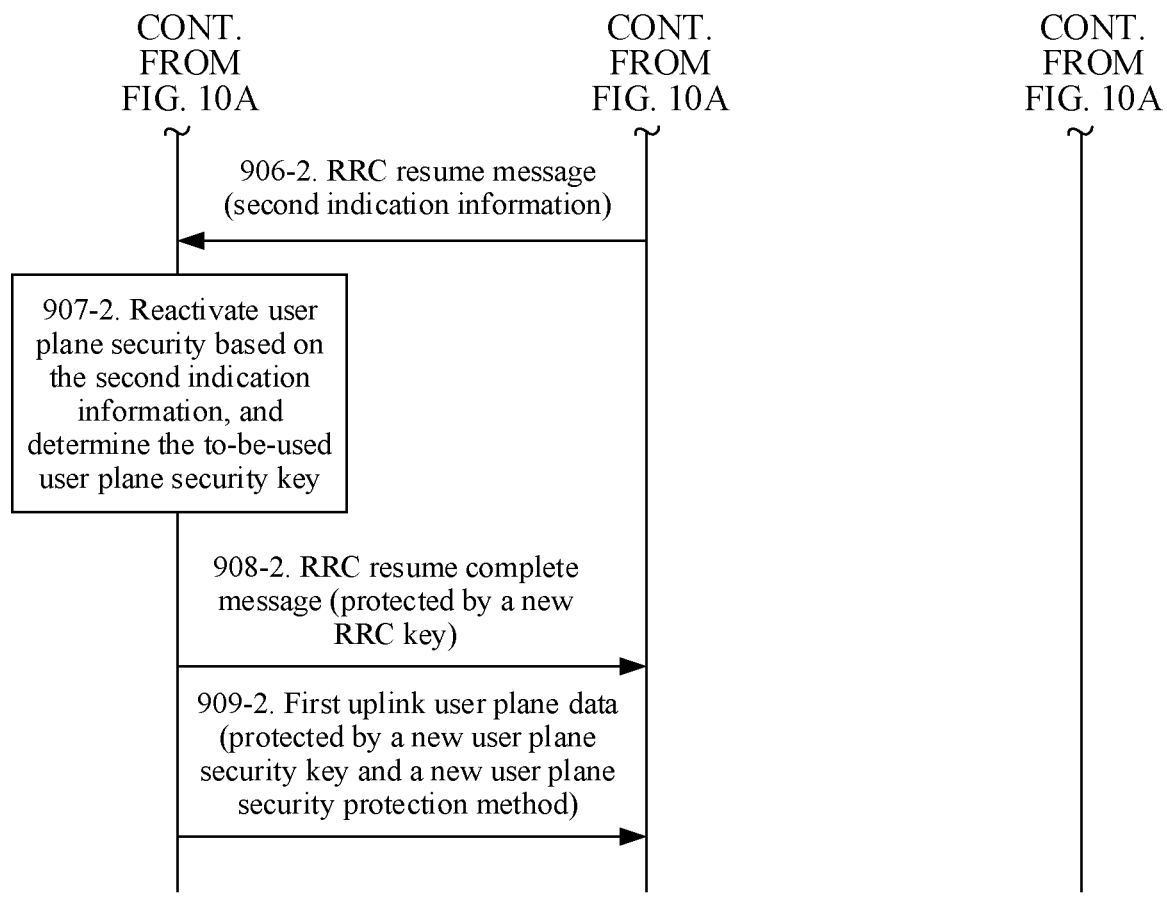

FIG. 10A and FIG. 10B are a schematic flowchart of a communication method according to Embodiment 10 of this application. This embodiment mainly describes how to perform security protection on user plane data in a resume process. The embodiment shown in FIG. 10A and FIG. 10B is based on the embodiment shown in FIG. 6. A UE and a source access network device each store a user plane security key. A user plane security key stored in a suspend process is referred to as an old user plane security key. The embodiment shown in FIG. 10A and FIG. 10B may include but is not limited to the following steps.

Step 901-2. The UE calculates a resume MAC-I using an RRC integrity protection key stored in the suspend process.

Step 902-2. The UE sends an RRC resume request to a target access network device. Correspondingly, the target access network device receives the RRC resume request from the UE.

Step 902-2*a*. The UE sends first uplink user plane data to the target access network device. Correspondingly, the target access network device receives the first uplink user plane data from the UE.

The UE performs security protection on uplink user plane data using an old user plane security key and a user plane security protection method that is indicated by first indication information, to obtain the first uplink user plane data. In other words, the UE performs security protection on the uplink user plane data using the old user plane security protection method and the old user plane security key, to obtain the first uplink user plane data.

Step 903-2. The target access network device sends a context information obtaining request to the source access network device. Correspondingly, the source access network device receives the context information obtaining request from the target access network device.

Step 904-2. The source access network device sends a context information obtaining response to the target access network device. Correspondingly, the target access network device receives the context information obtaining response from the source access network device.

The context information obtaining response includes a user plane security policy and the first indication information, and further includes the old user plane security key.

Step 905-2a. The target access network device performs security deprotection on the first uplink user plane data to obtain the uplink user plane data.

The target access network device performs security deprotection on the first uplink user plane data using the old user plane security protection method and the old user plane security key, to obtain the uplink user plane data.

Step 905-2b. The target access network device sends the uplink user plane data to a core network, and for example, sends the uplink user plane data to a UPF.

Step 905-2. If the target access network device supports an encryption algorithm and an integrity protection algorithm that are used by a source cell, the target access network device generates a new RRC key (including a new RRC encryption key and a new RRC integrity protection key) using KgNB*, and determines a to-be-used user plane security key.

Step 906-2. The target access network device sends an RRC resume message to the UE, where the RRC resume message includes second indication information. Correspondingly, the UE receives the RRC resume message from the target access network device.

Step 907-2. The UE activates user plane security based on the second indication information, and determines the to-be-used user plane security key.

After generating the new user plane security key, the UE deletes the old user plane security key.

Step 908-2. The UE sends an RRC resume complete message to the target access network device. Correspondingly, the target access network device receives the RRC resume complete message from the UE.

For implementation processes of step 905-2 to step 908-2, refer to the descriptions of step 705-2 to step 708-2 in the embodiment shown in FIG. 7B.

Step 909-2. The UE sends second uplink user plane data to the target access network device. Correspondingly, the target access network device receives the second uplink user plane data from the UE.

The UE performs security protection on the uplink user plane data using the new user plane security key and the new user plane security protection method that is indicated by the second indication information. In other words, the UE performs security protection on the uplink user plane data using the new user plane security protection method and the new user plane security key, to obtain the second uplink user plane data.

In the embodiment shown in FIG. 10A and FIG. 10B, user plane security activation is performed twice. The first user plane security activation is performed after the UE sends the RRC resume request, and in this case, the old user plane security key and the old user plane security protection method are used. The second user plane security activation is performed after the UE receives the second indication information, and in this case, the new user plane security key and the new user plane security protection method are used.

Figure 11:
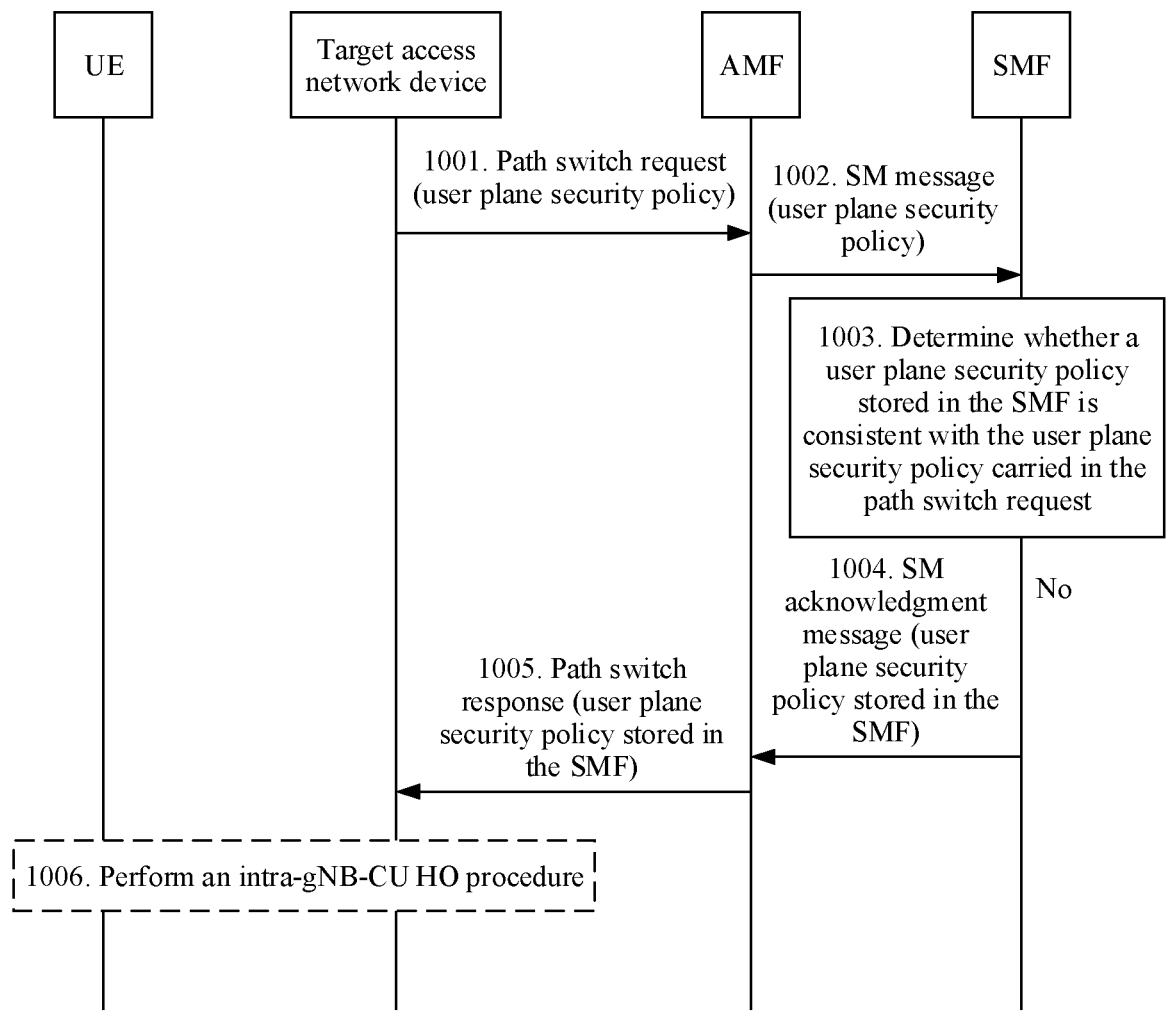
FIG. 11 is a schematic diagram of a path switch procedure according to an embodiment of this application.

FIG. 11 is a schematic diagram of a path switch procedure according to an embodiment of this application. The path switch procedure may be combined with Embodiment 1 to Embodiment 10. FIG. 7A is used as an example. The path switch procedure may be performed after step 704-1, may be performed between step 704-1 and step 705-1, or may be performed after step 709-1.

The embodiment shown in FIG. 11 may include but is not limited to the following steps.

Step 1001. A target access network device sends a path switch request to an AMF. Correspondingly, the AMF receives the path switch request from the target access network device.

The path switch request includes a user plane security policy, and the user plane security policy is sent by a source access network device to the target access network device. Optionally, the path switch request further includes granularity information corresponding to the user plane security policy.

Step 1002. The AMF sends a session management (SM) message to an SMF. Correspondingly, the SMF receives the SM message from the AMF.

The SM message includes the user plane security policy, and optionally, further includes the granularity information corresponding to the user plane security policy.

Step 1001 and step 1002 are that the target access network device sends the user plane security policy to the SMF through the AMF, and optionally, sends the granularity information corresponding to the user plane security policy.

Step 1003. The SMF determines whether a user plane security policy stored in the SMF is consistent with the user plane security policy carried in the path switch request.

If the switch request includes the user plane security policy and the granularity information corresponding to the user plane security policy, the SMF searches, based on the granularity information, for the user plane security policy corresponding to the granularity information, and determines whether the found user plane security policy is consistent with the user plane security policy carried in the switch request.

If the switch request does not include the granularity information corresponding to the user plane security policy, the switch request may further include an identifier of a UE. The SMF stores a user plane security policy corresponding to the identifier of the UE, and determines whether the user plane security policy corresponding to the identifier of the UE is consistent with the user plane security policy carried in the switch request.

Step 1004. If the user plane security policy corresponding to the identifier of the UE is inconsistent with the user plane security policy carried in the switch request, the SMF sends an SM acknowledgment (ACK) message to the AMF. Correspondingly, the AMF receives the SM acknowledgment message from the SMF.

The SM acknowledgment message includes the user plane security policy stored in the SMF Step 1005. The AMF sends a path switch response to the target access network device. Correspondingly, the target access network device receives the path switch response from the AMF.

The path switch response includes the user plane security policy stored in the SMF.

Step 1004 and step 1005 are that the SMF sends, to the target access network device using the AMF, the user plane security policy stored in the SMF.

Step 1006. The target access network device re-determines a user plane security protection method, and performs a handover procedure with the UE, where the handover procedure may be an intra-gNB-centralized unit (CU) handover (HO) procedure, such that the UE and the target access network device re-determine a user plane security protection method and activate user plane security.

If the path switch procedure is performed after step 704-1, or is performed between step 704-1 and step 705-1, step 1006 may not be performed. In step 705-1, the user plane security protection method is determined based on the user plane security policy obtained from the SMF. In this way, a delay can be shortened. If the path switch procedure is performed after step 709-1, step 1006 needs to be performed. The UE and the target access network device re-determine a user plane security protection method to correct the previously determined user plane security protection method.

The foregoing describes in detail the methods in the embodiments of this application. The following provides apparatuses in the embodiments of this application.

Figure 12:
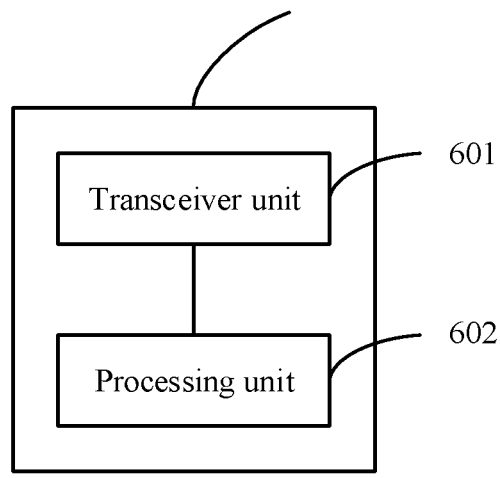
FIG. 12 is a schematic diagram of a logical structure of a communications apparatus according to an embodiment of this application.

FIG. 12 is a schematic diagram of a logical structure of a communications apparatus according to an embodiment of this application. The communications apparatus 60 may include a transceiver unit 601 and a processing unit 602. The communications apparatus 60 may be user equipment, a target access network device, or a source access network device.

For a case in which the communications apparatus 60 is a user equipment: the processing unit 602 is configured to: after the transceiver unit 601 sends an RRC resume request to a target access network device, determine a first user plane security protection method between the user equipment and the target access network device; determine a first user plane security key between the user equipment and the target access network device; and perform user plane security protection on uplink user plane data based on the first user plane security protection method and the first user plane security key, to obtain first uplink user plane data. The transceiver unit 601 is configured to send the first uplink user plane data to the target access network device.

When the communications apparatus 60 is a user equipment, the communications apparatus 60 may implement the functions of the UE in Embodiment 1 to Embodiment 10. For a detailed process of performing the functions by the units in the communications apparatus 60, refer to the execution steps of the UE in Embodiment 1 to Embodiment 10. Details are not described herein again.

For a case in which the communications apparatus 60 is a target access network device: the processing unit 602 is configured to: after the transceiver unit 601 receives an RRC resume message from a user equipment, determine a first user plane security protection method between the target access network device and the user equipment based on a context information obtaining response from a source access network device; determine a first user plane security key between the target access network device and the user equipment; and when the transceiver unit 601 receives first uplink user plane data from the user equipment, perform user plane security deprotection on the first uplink user plane data based on the first user plane security key and the first user plane security protection method, to obtain uplink user plane data. The transceiver unit 601 is configured to send the uplink user plane data, for example, send the uplink user plane data to a user plane function in a core network.

When the communications apparatus 60 is a target access network device, the communications apparatus 60 may implement the functions of the target access network device in Embodiment 1 to Embodiment 10. For a detailed process of performing the functions by the units in the communications apparatus 60, refer to the execution steps of the target access network device in Embodiment 1 to Embodiment 10. Details are not described herein again.

When the communications apparatus 60 is a source access network device, the communications apparatus 60 may implement the functions of the source access network device in Embodiment 1 to Embodiment 10. For a detailed process of performing the functions by the units in the communications apparatus 60, refer to the execution steps of the source access network device in Embodiment 1 to Embodiment 10. Details are not described herein again.

Figure 13:
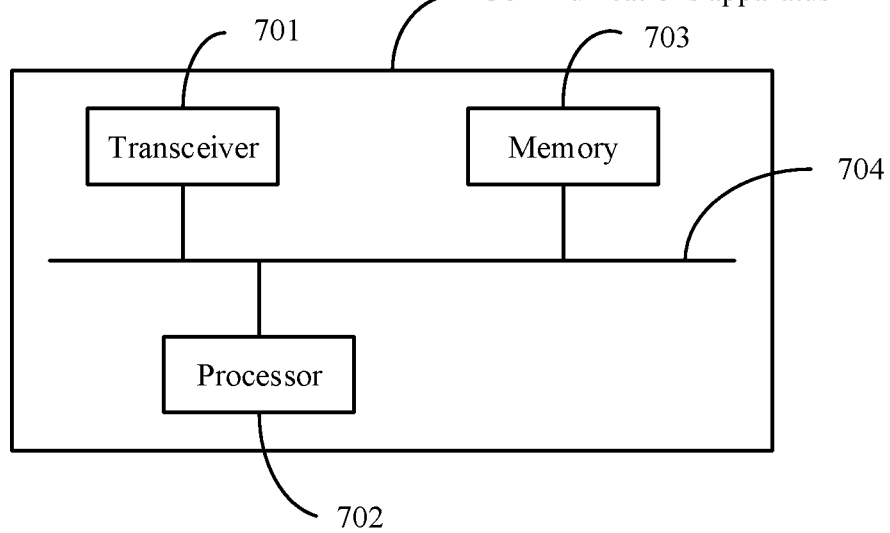
FIG. 13 is a simplified schematic diagram of a physical structure of a communications apparatus according to an embodiment of this application.

FIG. 13 is a simplified schematic diagram of a physical structure of a communications apparatus 70 according to an embodiment of this application. The communications apparatus 70 may be a user equipment, a target access network device, or a source access network device.

The communications apparatus 70 includes a transceiver 701, a processor 702, and a memory 703. The transceiver 701, the processor 702, and the memory 703 may be connected to each other through a bus 704, or may be connected to each other in another manner. A related function implemented by the transceiver unit 601 shown in FIG. 12 may be implemented by the transceiver 701. A related function implemented by the processing unit 602 shown in FIG. 12 may be implemented by one or more processors 702.

The memory 703 includes but is not limited to a random-access memory (RAM), a read-only memory (ROM), an erasable programmable read-only memory (EPROM), or a compact disc read-only memory (CD-ROM). The memory 703 is configured to store a related instruction and related data.

The transceiver 701 is configured to send data and/or signaling, and receive data and/or signaling.

If the communications apparatus 70 is the UE in Embodiment 1 to Embodiment 10, the transceiver 701 may be configured to communicate with the source access network device and the target access network device, for example, perform step 702-2, step 706-2, step 708-2, and step 709-2 in the embodiment shown in FIG. 7B.

If the communications apparatus 70 is the target access network device in Embodiment 1 to Embodiment 10, the transceiver 701 may be configured to communicate with the UE, the source access network device, and the AMF, for example, perform step 702-2, step 703-2, step 704-2, step 706-2, and step 708-2 and step 709-2 in the embodiment shown in FIG. 7B.

If the communications apparatus 70 is the source access network device in Embodiment 1 to Embodiment 10, the transceiver 701 may be configured to communicate with the target access network device and the UE, for example, perform step 703-2 and step 704-2 in the embodiment shown in FIG. 7B.

The processor 702 may be one or more processors, for example, may be one or more central processing units (CPUs). When the processor 702 is one CPU, the CPU may be a single-core CPU or a multi-core CPU.

If the communications apparatus 70 is the UE in Embodiment 1 to Embodiment 10, the processor 702 may be configured to perform and control an operation of the UE, for example, perform step 701-2 and step 707-2 in the embodiment shown in FIG. 7B.

If the communications apparatus 70 is the target access network device in Embodiment 1 to Embodiment 10, the processor 702 may be configured to perform and control an operation of the target access network device, for example, perform step 705-2 in the embodiment shown in FIG. 7B.

If the communications apparatus 70 is the source access network device in Embodiment 1 to Embodiment 10, the processor 702 may be configured to perform and control an operation of the source access network device.

The memory 703 is configured to store program code and data of the communications apparatus 70.

For details of the steps performed by the processor 702 and the transceiver 701, refer to the descriptions of Embodiment 1 to Embodiment 10. Details are not described herein again.

It may be understood that FIG. 13 merely shows a simplified design of the communications apparatus 70. In actual application, the communications apparatus 70 may further include other necessary components, including but not limited to any quantity of transceivers, processors, controllers, memories, communications units, and the like. All devices capable of implementing this application fall within the protection scope of this application.

An embodiment of this application further provides a communications system. The communications system may include a user equipment and a target access network device. The user equipment and the target access network device may be configured to implement the functions of the UE and the target access network device in Embodiment 1 to Embodiment 10. For details, refer to the implementation processes of the UE and the target access network device in Embodiment 1 to Embodiment 10.

The communications system may further include a source access network device. The source access network device may be configured to implement the functions of the source access network device in Embodiment 1 to Embodiment 10. For details, refer to the implementation process of the source access network device in Embodiment 1 to Embodiment 10.

A person of ordinary skill in the art may understand that all or some of the procedures of the methods in the foregoing embodiments may be implemented by a computer program instructing relevant hardware. The program may be stored in a computer-readable storage medium. When the program is executed, the procedures in the method embodiments may be performed. The foregoing storage medium includes any medium that can store program code, such as a ROM, a RAM, a magnetic disk, or an optical disc. Another embodiment of this application provides a computer-readable storage medium. The computer-readable storage medium stores an instruction. When the instruction is run on a computer, the computer is enabled to perform the methods in the foregoing aspects.

Another embodiment of this application further provides a computer program product including an instruction. When the computer program product runs on a computer, the computer is enabled to perform the methods in the foregoing aspects.

A person of ordinary skill in the art may be aware that, in combination with the examples described in the embodiments disclosed in this application, units and algorithm steps may be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that such an implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the division of units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented using software, hardware, firmware, or any combination thereof. When software is used to implement the embodiments, all or some of the embodiments may be implemented in a form of computer program product. The computer program product includes one or more computer instructions. When the computer program instructions are loaded and executed on a computer, the procedures or functions according to the embodiments of the present disclosure are all or partially generated. The computer may be a general-purpose computer, a special-purpose computer, a computer network, or another programmable apparatus. The computer instruction may be stored in a computer-readable storage medium, or may be transmitted using the computer-readable storage medium. The computer instruction may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD) or solid state disk), or the like.

The invention claimed is:

1. A method comprising:
receiving, by an apparatus and from a source access network device, a radio resource control (RRC) release message comprising suspend configuration information, wherein the suspend configuration information indicates the apparatus to enter an inactive state;
performing, by the apparatus, verification of integrity protection of the RRC release message using an RRC integrity protection key;

retaining, by the apparatus when the verification succeeds, an inactive-radio network temporary identifier (I-RNTI) and first indication information, wherein the first indication information indicates a user plane security protection method used before the apparatus enters the inactive state from a connected state, and wherein the user plane security protection method indicates whether at least one of user plane encryption protection or user plane integrity protection is enabled;

sending, by the apparatus and to a target access network device, an RRC resume request; and activating, by the apparatus using the user plane security protection method, user plane security between the apparatus and the target access network device when receiving an RRC resume message from the target access network device.

2. The method of claim 1, further comprising deleting, by the apparatus when the verification succeeds, an RRC encryption key, a user plane encryption key, and a user plane integrity protection key.

3. The method of claim 1, further comprising:

determining, by the apparatus, a first user plane security key between the apparatus and the target access network device;

obtaining, by the apparatus, protected uplink user plane data by performing user plane security protection on uplink user plane data based on the user plane security protection method and the first user plane security key; and sending, by the apparatus, the protected uplink user plane data to the target access network device.

4. The method of claim 3, wherein determining the first user plane security key comprises determining, by the apparatus, the first user plane security key according to the user plane security protection method.

5. The method of claim 1, further comprising:

sending, by the source access network device, the RRC release message, wherein the RRC release message further comprises the I-RNTI, and wherein the I-RNTI identifies the apparatus; and retaining, by the source access network device, the I-RNTI and the first indication information.

6. The method of claim 5, wherein the RRC resume request comprises the I-RNTI, and wherein the method further comprises:

receiving, by the target access network device, the RRC resume request from the apparatus;

sending, by the target access network device, a context information obtaining request comprising the I-RNTI;

receiving, by the source access network device, the context information obtaining request from the target access network device;

obtaining, by the source access network device, the first indication information based on the I-RNTI;

sending, by the source access network device and to the target access network device, a context information obtaining response comprising the first indication information;

receiving, by the target access network device, the context information obtaining response;

activating, by the target access network device using the user plane security protection method, user plane security between the target access network device and the apparatus when the user plane security protection method can be supported; and sending, by the target access network device, the RRC resume message to the apparatus.

7. The method of claim 6, wherein the context information obtaining response further comprises an encryption algorithm used by the source access network device, an integrity protection algorithm used by the source access network device, and a new access stratum key (KgNB*) generated by the source access network device, and wherein the method further comprises determining, by the target access network device, a first user plane security key between the target access network device and the apparatus based on the KgNB* when the target access network device supports the encryption algorithm and the integrity protection algorithm.

8. The method of claim 6, wherein the context information obtaining response further comprises a user plane security policy of the apparatus, and wherein the user plane security policy comprises at least one of a user plane encryption protection policy or a user plane integrity protection policy.

9. The method of claim 6, wherein the context information obtaining response further comprises a protocol data unit (PDU) session identifier (ID) corresponding to the first indication information.

10. The method of claim 6, further comprising determining, by the target access network device, whether the user plane security protection method can be supported.

11. An apparatus comprising:

a processor coupled to a memory storing instructions and configured to execute the instructions to cause the apparatus to:

receive, from a source access network device, a radio resource control (RRC) release message comprising suspend configuration information, wherein the suspend configuration information indicates the apparatus to enter an inactive state;

perform verification of integrity protection of the RRC release message using an RRC integrity protection key;

retain, when the verification succeeds, an inactive-radio network temporary identifier (I-RNTI) and first indication information, wherein the first indication information indicates a user plane security protection method used before the apparatus enters the inactive state from a connected state, and wherein the user plane security protection method indicates whether at least one of user plane encryption protection or user plane integrity protection is enabled;

send an RRC resume request to a target access network device; and activate, by using the user plane security protection method, user plane security between the apparatus and the target access network device when receiving an RRC resume message from the target access network device.

12. The apparatus of claim 11, wherein the processor is further configured to execute the instructions to cause the apparatus to delete, when the verification succeeds, an RRC encryption key, a user plane encryption key, and a user plane integrity protection key.

13. The apparatus of claim 11, wherein the processor is further configured to execute the instructions to cause the apparatus to:

determine a first user plane security key between the apparatus and the target access network device;

obtain protected uplink user plane data by performing user plane security protection on uplink user plane data based on the user plane security protection method and the first user plane security key; and send the protected uplink user plane data to the target access network device.

14. The apparatus of claim 13, wherein the processor is further configured to execute the instructions to cause the apparatus to further determine the first user plane security key according to the user plane security protection method.

15. A communications system comprising:
a user equipment (UE) configured to:
  receive, from a source access network device, a radio resource control (RRC) release message comprising suspend configuration information, wherein the suspend configuration information indicates the UE to enter an inactive state;
  perform verification of integrity protection of the RRC release message using an RRC integrity protection key;
  retain, when the verification succeeds, an inactive-radio network temporary identifier (I-RNTI) and first indication information, wherein the first indication information indicates a user plane security protection method used before the UE enters the inactive state from a connected state, and wherein the user plane security protection method indicates whether at least one of user plane encryption protection or user plane integrity protection is enabled; and
  send an RRC resume request; and
a target access network device configured to:
  receive, from the UE, the RRC resume request;
  send, to the source access network device, a context information obtaining request comprising the I-RNTI;
  receive, from the source access network device, a context information obtaining response comprising the first indication information;
  activate, using the user plane security protection method, user plane security between the target access network device and the UE when the user plane security protection method can be supported; and
  send an RRC resume message to the UE,
wherein the UE is further configured to activate, using the user plane security protection method, the user plane security when receiving the RRC resume message from the target access network device.

16. The communications system of claim 15, wherein the communications system further comprises the source access network device, and wherein the source access network device is configured to:
  send, to the UE, the RRC release message, wherein the RRC release message further comprises the I-RNTI, and wherein the I-RNTI identifies the UE;
  retain the I-RNTI and the first indication information;
  receive, from the target access network device, the context information obtaining request;
  obtain the first indication information based on the I-RNTI; and
  send, to the target access network device, the context information obtaining response.

17. The communications system of claim 16, wherein the context information obtaining response further comprises an encryption algorithm used by the source access network device, an integrity protection algorithm used by the source access network device, and a new access stratum key (KgNB*) generated by the source access network device, and wherein the target access network device is further configured to determine a first user plane security key between the target access network device and the UE based on the KgNB* when the target access network device supports the encryption algorithm and the integrity protection algorithm.

18. The communications system of claim 16, wherein the context information obtaining response further comprises a user plane security policy of the UE, and wherein the user plane security policy comprises at least one of a user plane encryption protection policy or a user plane integrity protection policy.

19. The communications system of claim 16, wherein the context information obtaining response further comprises a protocol data unit (PDU) session identifier (ID) corresponding to the first indication information.

20. The communications system of claim 16, wherein the target access network device is further configured to determine whether the user plane security protection method can be supported.

* * * * *